(12) United States Patent
Miki

(10) Patent No.: US 6,810,474 B1
(45) Date of Patent: Oct. 26, 2004

(54) INFORMATION PROCESSOR

(75) Inventor: Yoshio Miki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/623,182

(22) PCT Filed: Mar. 4, 1998

(86) PCT No.: PCT/JP98/00885

§ 371 (c)(1),
(2), (4) Date: Aug. 29, 2000

(87) PCT Pub. No.: WO99/45463

PCT Pub. Date: Sep. 10, 1999

(51) Int. Cl.[7] ............................. G06F 9/30; G06F 9/38; G06F 9/40

(52) U.S. Cl. ...................... 712/216; 712/217; 712/218; 712/219; 712/213; 712/236; 712/237; 712/240

(58) Field of Search ................................ 712/239, 221, 712/238, 240, 216, 214, 245, 219, 231, 236, 237, 217, 218, 213

(56) References Cited

U.S. PATENT DOCUMENTS

| | | | | |
|---|---|---|---|---|
| 5,136,696 A | * | 8/1992 | Beckwith et al. | 712/240 |
| 5,522,052 A | * | 5/1996 | Inoue et al. | 712/216 |
| 5,737,590 A | * | 4/1998 | Hara | 712/238 |
| 5,864,697 A | * | 1/1999 | Shiell | 712/240 |
| 6,016,540 A | * | 1/2000 | Zaidi et al. | 712/214 |

FOREIGN PATENT DOCUMENTS

| | | | |
|---|---|---|---|
| JP | 60129839 | * | 7/1985 |
| JP | 62084340 | * | 4/1987 |
| JP | 01187634 | * | 7/1989 |
| JP | 03161831 | * | 7/1991 |
| JP | 07219771 | * | 8/1995 |
| JP | 09134287 | * | 5/1997 |

OTHER PUBLICATIONS

Avinash Sodani et al., Dynamic Instruction Reuse, pp. 194–205, 1997 ACM.*
M. Lipasti et al., Exceeding the Dataflow Limit via Value Prediction, pp. 226–237, 1996 IEEE.*
R.J. Eickemeyer et al, "A load–instruction unit for pipelined processors," IBM Journal of Res. Develop., vol. 37, No. 4, Jul. 1993, pp 547–564.
T. Sato et al, "Hiding Data Cache Latency with Load Address Prediction," IEICE Transaction on Information & Systems, vol. E79–D, No. 11, Nov. 1996, pp. 1523–1532.
Technical Digest, 24th International Symposium on computer Architecture, (ISCA), 1997, pp. 194–205.
Technical Digest, 29th Annual IEEE/ACM International Symposium on Microarchitecture (Micro–29), pp. 226–237.

* cited by examiner

Primary Examiner—Daniel H. Pan
(74) Attorney, Agent, or Firm—Mattingly, Stanger & Malur, P.C.

(57) ABSTRACT

In a conventional information processor that performs speculative execution of a following instruction having a data dependency, since an arithmetic and logical unit is used in performing the speculative execution and the same ALU is used again when the prediction is wrong, the frequency of use of the ALU increases.

To prevent this, a history ALU for outputting a past execution result of an instruction, as it is, as an execution result of the instruction and an instruction issue circuit for issuing an instruction whose operand is the same as a past value to the history ALU are provided with an intention of omitting the actual speculative execution. A Guard cache provided in the history cache stores addresses of instructions that give low prediction accuracy, whereby any instruction whose address has been registered in the Guard cache is prevented from being registered again in the history cache.

4 Claims, 20 Drawing Sheets

FIG. 6

| IRB \ IRA | D COMPLETION | SPECULATION COMPLETION | | UNCHANGE COMPLETION | | USUAL COMPLETION |
|---|---|---|---|---|---|---|
| | | SPECULATION ONLY | SPECULATION & UNCHANGE | UNCHANGE ONLY | | |
| D COMPLETION | ISSUE TO ALU | ISSUE TO ALU & SPECULATIVE EXECUTION | ISSUE TO ALU & SPECULATIVE EXECUTION | ISSUE TO ALU | | ISSUE TO ALU |
| SPECULATION COMPLETION / SPECULATION ONLY | ISSUE TO ALU & SPECULATIVE EXECUTION | ISSUE TO ALU & SPECULATIVE EXECUTION | ISSUE TO ALU & SPECULATIVE EXECUTION | ISSUE TO ALU & SPECULATIVE EXECUTION | | ISSUE TO ALU & SPECULATIVE EXECUTION |
| SPECULATION COMPLETION / SPECULATION & UNCHANGE | ISSUE TO ALU & SPECULATIVE EXECUTION | ISSUE TO HEU & SPECULATIVE EXECUTION | ISSUE TO HEU & SPECULATIVE EXECUTION | ISSUE TO HEU & SPECULATIVE EXECUTION | | ISSUE TO ALU & SPECULATIVE EXECUTION |
| UNCHANGE COMPLETION / UNCHANGE ONLY | ISSUE TO ALU | ISSUE TO HEU & SPECULATIVE EXECUTION | ISSUE TO HEU & SPECULATIVE EXECUTION | ISSUE TO HEU | | ISSUE TO ALU |
| USUAL COMPLETION | ISSUE TO ALU | ISSUE TO ALU & SPECULATIVE EXECUTION | ISSUE TO ALU & SPECULATIVE EXECUTION | ISSUE TO ALU | | ISSUE TO ALU |

INFORMATION PROCESSOR

TECHNICAL FIELD

The present invention relates to an information processor that performs predetermined operations according to the programmed instruction words, and specifically relates to the technology for shortening processing time of the information processor in the case where a dependency on the reference data exist between the instruction words.

BACKGROUND ART

In the information processor as typified by the microprocessor, any desired operation for the processing of information is executed by carrying out an operation specified by a programmed instruction words. It is the principle that reading of the instruction words and the execution of the operations should be done in the sequence of the instruction words, and hence a following instruction that is to refer to data generated by a preceding instruction in the program must wait for termination of the execution of the preceding instruction. This is a limitation that a following instruction cannot overtake a preceding instruction due to the so-called data dependency even if how much the following instruction is fast.

In terms of shortening of the processing time of the information processor, it is impossible to achieve the shortening of the processing time that surpasses the above-mentioned limitation unless the execution result of the preceding instruction is predicted by some kind or another predicting means and the execution of the following instruction gets started based on the prediction. A method where the instruction is executed based on the prediction is called speculative execution or speculation execution, which is not limited to this case. For methods of the speculative execution of the instruction having the data dependency described in this paragraph, the following technologies are known.

A technology disclosed in "IBM Journal of R&D, Vol.37, No.4, pp. 547–564, July (1993)" and "IEICE Transaction on Information and Systems, Vol.E79-D, No.11, pp. 1523–1532, November (1996)" (hereinafter referred to as "literature 1") is for predicting an address on memory where data to be loaded is stored, namely, the load address, with respect to the load instruction for reading the data from memory outside an information processor into a register inside the information processor. The load address is reference information indispensable to perform the execution for the load instruction. Generally, there is a relation that the preceding instruction generates the actual load address or information necessary to calculate the load address and then the load instruction refers to it. Moreover, the execution time of the load instruction is long in general, and hence preferably the execution of the load instruction gets started as early as possible. In the technology disclosed in the literature 1, a cache-like mechanism is provided that can retrieve a load address used by the load instruction in the past using the address where the load instruction is stored as a key when the load instruction is read into the information processor and the load address is predicted without waiting for the execution termination of the preceding instruction by which the load address is actually fixed. The loading operation from the memory is initiated based on this load address. On the other hand, the load address calculation not based on the prediction concerned is concurrently executed. Load address calculation results through these two ways are collated. When the coincidence is obtained, whole processing time is shortened by the amount of preceded loading from the memory based on the prediction. When the coincidence is not obtained, whole processing time becomes the original execution time of the load instruction. By the way, the instruction for referring to the data that is loaded by the load instruction is not executed speculatively, but the execution is made to wait until correctness of the load address prediction is judged.

In the literature 1, the content of the prediction is limited to the load address and there is no disclosure regarding a point that an instruction for referring to the result of the loading etc. is executed speculatively. Regarding this point, technologies extended in such a way that the operation result is predicted for a general instruction and a following instruction that refers to the predicted operation result thereof is executed speculatively are disclosed in the following literatures: Technical Digest, 24th International Symposium on Computer Architecture (ISCA), pp. 194–205 (1997); Technical Digest, 29th Annual IEEE/ACM International Symposium on Microarchitecture (MICRO-29), pp. 226–237 (hereinafter referred to as "literature 2"); Japanese Patent Prepublication No. 60-129839 (hereinafter referred to as "literature 3"); Japanese Patent Prepublication No. 62-84340 (hereinafter referred to as "literature 4"); and Japanese Patent Prepublication No. 01-187634 (hereinafter referred to as "literature 5"). In each of the technologies disclosed in the literatures 2 to 5, memory for storing the past execution result of the instruction is provided in an information processor, and when the instruction is read into the information processor or is intended to be executed, the past execution result is outputted as a prediction for the execution of this time. If the following instruction has the data dependency, the speculative execution of the following instruction is initiated at the time of outputting of this prediction result. Thus, the instructions having the data dependency are executed speculatively in order as a system of a chain of instructions. In those technologies, the original execution result of the instruction and the prediction result are all collated, and when the coincidence is not obtained, an instruction having the data dependency just after the occurrence of inconsistence and instructions thereafter are executed again. In other word, all the results that were executed speculatively based on the prediction are discarded and the instruction execution is performed again.

As described above, in the information processor disclosed in the above-mentioned literatures 1 to 5 where the execution result is predicted and the following instruction having the data dependency is executed speculatively, an arithmetic and logical unit is used in performing speculative execution, and when the prediction goes wrong, the same arithmetic and logical unit is used again. Therefore, the frequency of use of the arithmetic and logical unit increases, and the information processor entails a risk of deterioration in terms of the processing time due to conflicting on the arithmetic and logical unit. This problem has not been examined in the above-mentioned literatures 1 to 5, but has been found through examination by the inventors of the present invention.

Moreover, in the technologies disclosed in the above-mentioned literatures 1 to 5, storage means for storing the past operation results is essential. Specifically, it is postulated that the storage means whose capacity is as large as that of the so-called instruction cache is indispensable because the storage means must store the operation results for the instructions. In the general information processor, in odor to shorten the processing time, it is effective to install the instruction cache and the data cache additionally. Therefore, even though the storage means to be used for the prediction of the instruction execution is provided in a limited-space device, the storage means that is used for predicting the instruction execution cannot chose but be a small scale one, because securing the capacity of the instruction cache and the data cache take first priority in general.

DISCLOSURE OF THE INVENTION

Then, a first object of the present invention is to circumvent the conflicting on the arithmetic and logical unit not using an original arithmetic and logical unit when a following instruction having the data dependency is executed speculatively.

Moreover, a second object of the present invention is to provide a technology whereby high prediction accuracy is secured even when small-scale storage means for the execution results is used.

The above-mentioned first object is solved by the following means. That is, a history arithmetic and logical unit for outputting the past execution result of the instruction as it is as the execution result of the instruction and an instruction issue circuit for issuing an instruction whose operand is the same as the past value to the history arithmetic and logical unit are provided, thereby the speculative execution itself is omitted. As a result, the conflicting on the arithmetic and logical unit can be avoided.

The above-mentioned second object is solved by the following means. That is, a Guard cache for storing the instruction addresses of the instructions that give low prediction accuracy is provided in the history cache for storing the past operation result and any instruction whose address has been registered in the Guard cache is prevented from being registered again in the history cache. As a result, the instructions that give high prediction accuracy are held in the history cache, so that high prediction accuracy can be secured even when small-scale storage means for the execution results is used.

BRIEF DESCRIPTION OF THE DRAWINGS

FIG. 6 is an explanatory drawing showing the operation of an instruction issue circuit.

BEST MODE FOR CARRYING OUT THE INVENTION

Figure 1:
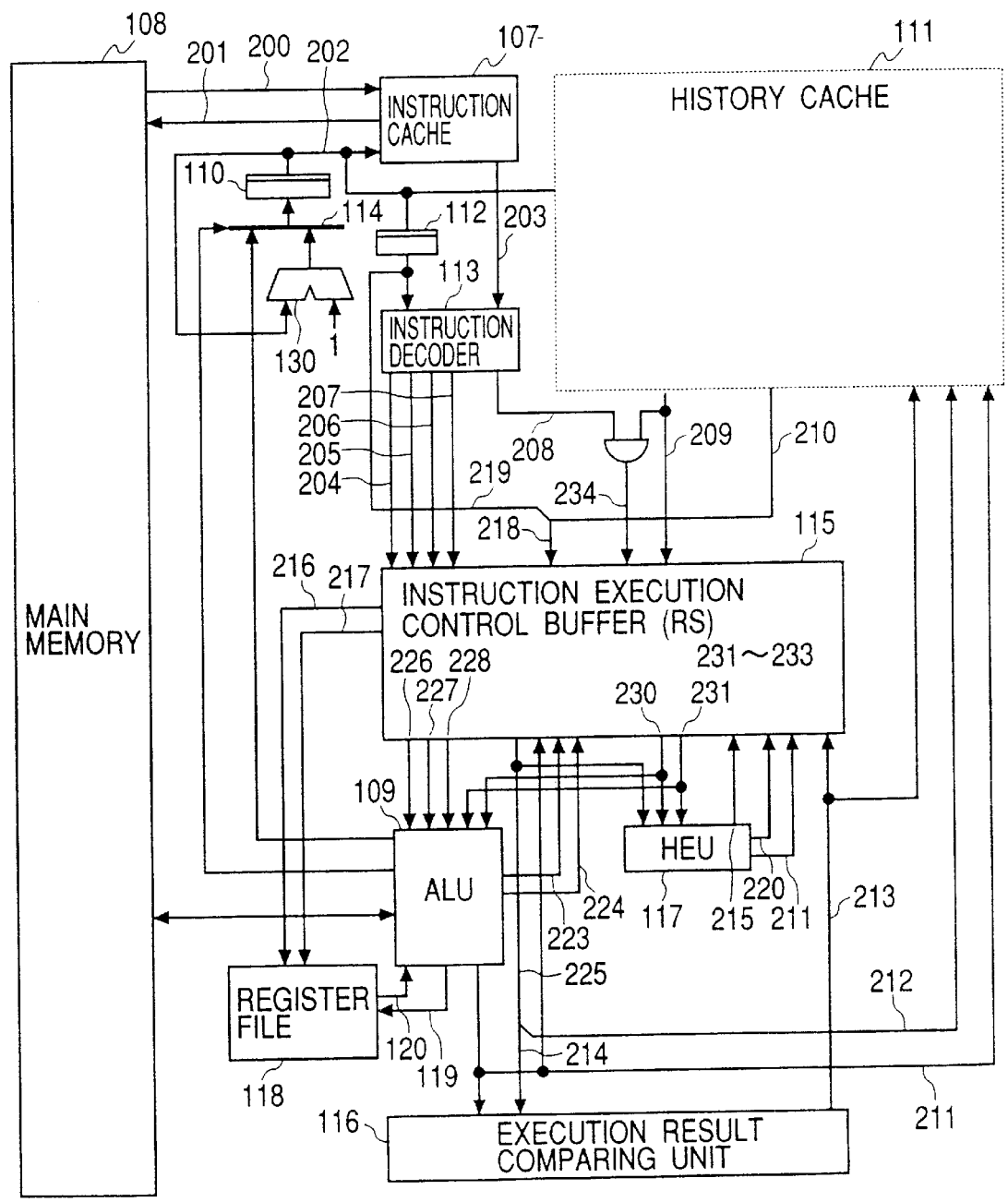
FIG. 1 is a view showing an information processor as one embodiment according to the present invention.

First, referring to FIG. 1, the information processor of the one embodiment according to the present invention will be described. FIG. 1 is the block diagram of the information processor. An instruction for controlling the information processor is read from main memory 108 through an instruction cache 107. The main memory 108 is composed of semiconductor memory etc. and instruction words and data necessary for executing the instructions are stored in the main memory 108. A construction and a function of the instruction cache 107 are realized by technologies that are commonly used in the microprocessor etc. and don't have deep relevance to the contents of the present invention, and hence a detailed explanation is omitted. A signal line 201 is an address line for transmitting an address of the instruction word to be read by the instruction cache to the main memory and the instruction word is stored in the instruction cache 107 via a signal line 200. An address of the instruction that this information processor executes is indicated by a program counter 110. In this embodiment, it is assumed that the address is represented by 32-bits and one instruction word uses 32-bits. Provided that the instruction words are arranged at every boundaries of four bytes (32-bits) areas in the main memory 108, 30-bits are necessary to indicate one instruction word. From this fact, the program counter 110 is realized with a register of 30-bits. The content of the program counter 110 is outputted as an instruction address 202 every one clock cycle, and the instruction word corresponding to this address is outputted to a signal line 203 of the instruction cache 107. The value of the program counter 110 is normally updated by +1 count by an adder 130. However, when a branch instruction is executed by an ALU 109 and the address of the instruction to be executed is changed, a new address of the instruction is inputted into the counter 110 by a selector 114.

Figure 18:
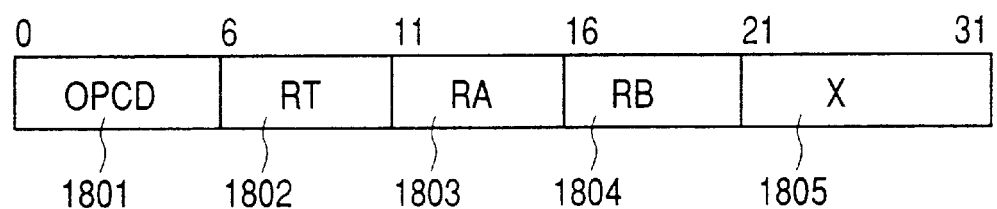
FIG. 18 is a view showing an instruction format.

An instruction decoder 113 decodes an outputted instruction word on the signal line 203. Moreover, the instruction address 202 is delayed by a latch 112 by the amount comparable to the processing time of the instruction cache 107 and the instruction decoder 113 and then inputted into an instruction execution control buffer 115. The instruction word is expressed by 32-bits as shown in FIG. 18, and a first OPCD field 1801 thereof represents a kind of the instruction which is decoded by the decoder 113 to an ALU number 204 for identifying an arithmetic and logical unit to be used. An RT field 1802 represents a number for a register into which the operation result is to be stored. The instruction decoder 113 only cuts a field out of the instruction and outputs it as a RT number 205. Moreover, an RA field 1803 and an RB field 1804 represent numbers for the registers (operand registers) each having an input value (operand) of the operation to be executed by the instruction words. The instruction decoder 113 only performs the cutting of fields, as in the case of the RT field 1802, and outputs those as a RA number 206 and a RB number 207, respectively. An X field 1805 will be used for the extension of the instruction and isn't used in this embodiment. Furthermore, the instruction decoder 113 sets a long-latency signal 208 to logical value '1' if the operation specified by the OPCD field 1801 is the load instruction. This long-latency signal 208, in the operation of the instruction execution control buffer 115, which will be described later, means that the prediction value is used for the operation result, being a signal for distinguishing particular instructions that will be made the target of this operation. Therefore, a case where the long-latency signal 208 is set to '1' is not limited to a case where the load instruction requires so, and can be extended in such a way that other instruction can set the long-latency signal 208 to '1'.

A history cache 111 is a cache whose input is the instruction address and which outputs the operation result at a time when the instruction was executed in the past. The history cache 111 is a constituent that plays a principle role in the present invention. A detailed description of the configuration being given later, the instruction address 202 of 32-bits is allocated to, from the upper, 0th to 31st bit address and by using 10-bits from 20th bit to 29th bit the memory where the past operation results are stored is referred. Twenty bits from the 0th bit to the 19th bit of the instruction address 202 is used as tag bits when referring to the history cache 111, that is, being used for the judgment of the validity of the data stored in the history cache 111. When an instruction corresponding to the instruction address 202 is stored in the instruction cache 111, an instruction cache hit signal 209 is set to logical value '1' and the prediction value for the instruction execution result is outputted at an execution result prediction 210. The history cache 111 is updated as follows. The address of the instruction having executed by the ALU 109 is inputted into an execution termination instruction address 212 and the execution result thereof is inputted into the history cache 111 as ALU-DATA 211. Except for a detailed control inside the history cache 111 which will be described later, principally the result calculated by the ALU 109 and the corresponding instruction address are all to be registered in the history cache 111. However, when an unchanging detection signal 213 takes logical value '1', the registration to the history cache 111 is controlled assuming that the instruction execution is done as predicted.

A execution result comparing unit 116 compares the execution prediction result of the instruction and the actual execution result by the ALU 109. The execution prediction result of the instruction is outputted from the history cache 111 as the execution result prediction 210 and outputted from the instruction execution control buffer 115 as a termination prediction 214. With respect to the instruction concerned, a value of the execution result prediction 210 and that of the termination prediction 214 are identical with each other. On the other hand, the original instruction execution and termination result of the instruction is outputted at ALU-DATA 211, which is compared by an execution result comparing unit 116. The execution result comparing unit 116 is composed of virtually only a comparator and outputs logical value '1' to the unchanging detection signal 213 when the termination prediction 214 and the ALU-DATA 211 are coincident to each other.

A connection relation between the ALU 109 and the instruction execution control buffer 115 is as follows. Numerals 226 and 227 are signals for indicating the operand registers RA, RB of the to-be-issued instruction, respectively, a numeral 228 is a signal for indicating the kind of the arithmetic and logical unit that the to-be-issued instruction uses, a numeral 229 is a signal for indicating a number for the target register of the instruction, a numeral 230 is a signal for indicating that the instruction execution is executed speculatively, and a numeral 231 is a signal for identifying which instruction in the instruction execution control buffer 115 was issued.

An HEU 117 is an arithmetic and logical unit named by abbreviating "Historical Evaluation Unit", and this is an original unit of the present invention. A function of the HEU 117 is simply outputting the execution prediction result of the instruction, as it is, for the operation result as HEU-DATA 215 and also regarding other input/output signals, as will be described later, simply outputting it as it is without doing logical operation.

A register file 118 comprises thirty-two pieces of thirty-two bit registers. The register file 118 is given an operand register number as an operand request 119 by the ALU 109, and returns the content of a register of the corresponding register number as operand data 120 to the ALU 109. Updating the content of the register file 118 is done by the instruction execution control buffer 115. The instruction execution control buffer 115 controls all the information regarding the later-described instruction execution throughout a period from the time when the instruction is transferred from the instruction decoder 113 (this transferring being called a dispatch of the instruction) to the time when the execution result of the instruction is completely fixed (this fixation being called "completion"). An instruction that can be executed to completion outputs a value to one of the registers, and at that time the register number and the data thereof are outputted as a completion register number 216 and as completion data 217, respectively, to the register file 118.

The above is an explanation of the outline construction of the embodiment according to the present invention.

Next, referring to the flowchart of FIG. 2, the information processor of this embodiment will be described in terms of the operation.

The information processor of this embodiment has the following operation modes in rough classification. A first mode is a mode whereby the information processor waits for the termination of a preceding instruction having the data dependency with a following instruction and after its termination executes the following instruction, as is the case of normal processors. This mode is called a normal mode. A second mode is a mode whereby the execution result of the instruction is compared with execution prediction result, and for an instruction of which all the operands are the same as the prediction (the execution result of the instruction for generating the operands is just as the prediction), the operation by the normal arithmetic and logical unit is not performed and the prediction result is assumed as the operation result. This second mode is defined as an unchanging propagation mode. That is, this mode is based on an idea that when all the input data are the same as the prediction, namely the past execution results, the instruction presently concerned must generate the same result as the past result and hence actual operation can be omitted. A third mode is a mode whereby the following instruction is executed speculatively based on the execution prediction result similarly to a prior art method with the use of the execution result prediction. This is called a speculative execution mode. The unchanging propagation mode also uses the prediction result but a point that the coincidence between the prediction result and the actual execution result is assured differentiates the unchanging propagation mode from the speculative execution mode.

Figure 2:
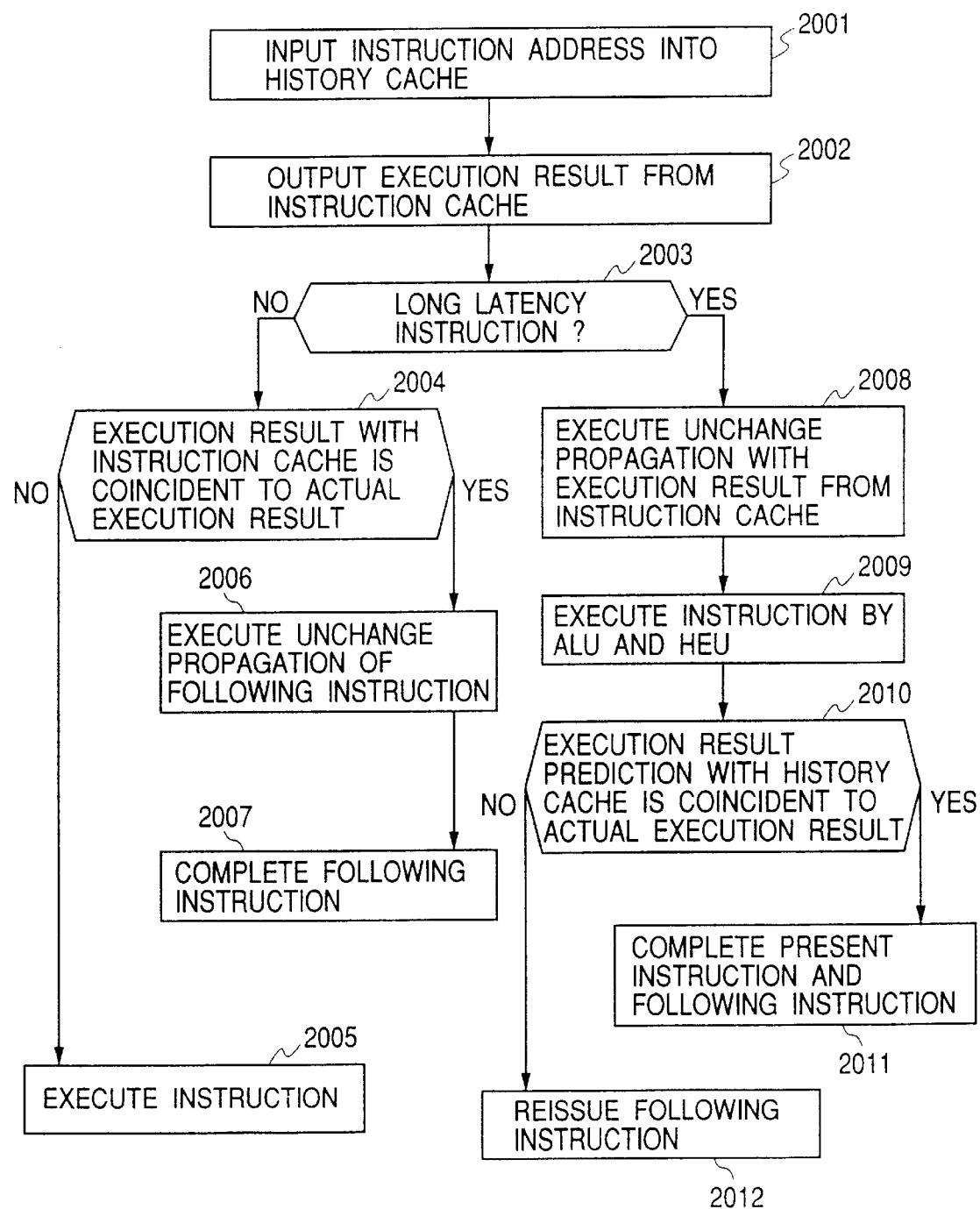
FIG. 2 is a flowchart showing the operation of the information processor according to the present invention.

The three modes described above are realized as functions of the instruction execution control buffer 115 of FIG. 1 and the instruction execution of the whole information processor is controlled according to the flowchart of FIG. 2. First, the instruction address is inputted into the history cache 111, and the execution prediction result of the instruction is taken out (2001, 2002). Needless to say, there may be a case where the said instruction address is not registered in the history cache but in such a case there can exist only the normal mode, hence omitting description thereof. The instruction is decoded by the instruction decoder 113, and if it requires a long latency as a load instruction, the speculative execution mode is executed (2003). A merit of the speculative execution lies in a fact that the following instruction can be initiated without waiting for the intrinsic execution termination of the instruction; therefore the merit of the speculative execution cannot be expected unless the instruction has a large number of cycles of the execution, that is, being an instruction of a long latency. Consequently, whether or not the instruction is one that requires a long latency is judged at the step 2003, and if so, the instruction execution control buffer 115 controls in such a way that the speculative execution mode is executed. This eliminates congestion of the arithmetic and logical unit caused by the speculative execution of a short-latency instruction that gives only a small effect of the speculative execution. Any instruction whose latency is not long cannot fail to be executed by the ALU 109 and its execution result is collated with the output result of the history cache 111 by an execution result comparing unit 116 (2004). When both results doesn't coincide with each other, the prediction information of the execution result cannot be unitized; therefore the following instruction detects that the operand has been computed and initiates the instruction execution (2005). This procedure corresponds to the previously described normal mode. The flow returns to the branch 2004 on the flowchart of FIG. 2 and when the execution result of the instruction and the prediction result are coincident to each other, the unchanging detection signal 213 is outputted from the execution result comparing unit 116 and a fact that the operation result and the prediction result are coincident to each other is informed to the following instruction waiting in the instruction execution control buffer 115. If all the operands of the waiting instruction are the same as the prediction result, according to the previously described principle, it is duly considered that the execution result of the waiting instruction will be the same as the prediction. Concretely, the waiting instruction is transferred to the HEU 117 and the prediction result, as it is, is made to be the execution result. If there exists an instruction waiting for this result as an operand in the instruction execution control buffer 115, the waiting instruction is also transferred to the HEU 117. Thus, once the actual operation result and the prediction result coincide with each other, there is a possibility that an instruction that uses the operation result as the operand yields a result just like the prediction, so the above-mentioned operation like a chain reaction can be continued until an instruction one of whose operands will change is encountered. This chain of operations is called unchanging propagation (2006) and by means of the unchanging propagation the operation can be virtually completed only with a function of the HEU 117. Since the execution result obtained by the unchanging propagation (being equal to the prediction result) is equal to the true execution result, the register file 118 can be made to reflect the execution result (2007).

In the case of the long-latency instruction, the operation of the speculative execution mode is performed (2003). In the speculative execution mode, the execution of the following instruction is initiated before the correctness of the execution result by the prediction is confirmed. That is, the long-latency instruction is transferred from the instruction execution control buffer 115 to both the ALU 109 and the HEU 117 (2009). Transferring of the instruction from the instruction execution control buffer 115 to the ALU 109 or the HEU 117 in this way is called instruction issue. The HEU 117 informs an instruction waiting in the instruction execution buffer 115 that the result based on the prediction is the execution result, through the same path as that of the previous unchanging propagation. After that, the unchanging propagation operation like a chain reaction described above is repeated (2008). However, in the speculative execution mode, even if the computation result based on the prediction is obtained by the unchanging propagation, the result cannot be considered as the true result. That is, since the long-latency instruction is issued to both the ALU 109 and the HEU 117, whether or not the prediction is correct can be judged at the time of the termination of the execution in the ALU 109 (2010). This judgment is executed by the execution result comparing unit 116. If the prediction and the true execution result coincide with each other (2010), it means that all the speculative unchanging propagation operations were correct, and the long-latency instruction concerned and all the instructions that have taken the prediction result as the execution results by the unchanging propagation become completion-possible (i.e. an instruction can be executed completely to fix its result)(2011). Further, if the prediction and the true execution result are not coincident to each other, all the instructions having the data dependency are executed again by the ALU 109 (2012).

The above is an explanation of the operations of the normal mode, the speculative execution mode, the unchanging propagation mode of the information processor in this embodiment. In the information processor according to the present invention, based on an idea that, when the prediction value based on the past history is correct, the following instruction that refers to that value also outputs the same result as the past result, the execution result based on the prediction is obtained by the method called unchange propagation wherein an arithmetic and logical unit that is to be used originally is not used. As a result, the congestion of the arithmetic and logical unit is mitigated.

Next, detail of each of constituent parts whole of which realize the operation of the above-mentioned information processor will be described.

Figure 3:
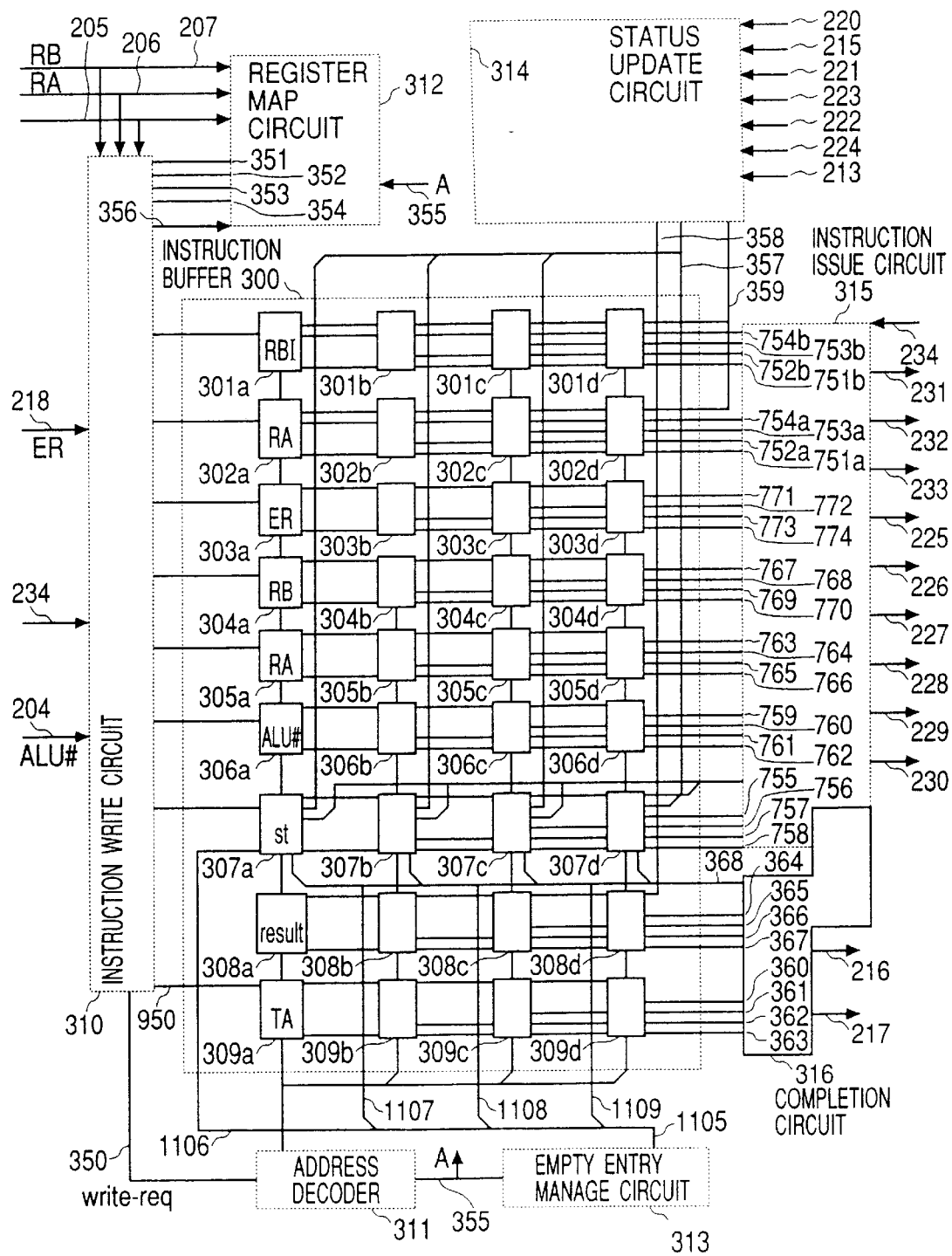
FIG. 3 is a block diagram of an instruction execution control buffer.

FIG. 3 is a block diagram of the instruction execution control buffer 115. An instruction buffer 300 constructs a buffer for making an instruction before execution wait therein. The instruction buffer 300 is composed of the following memory elements for storing configuration information of the instruction. The RBI(301a, 301b, 301c, 301d) stores location information in the instruction buffer 300 where the instruction for generating the value of the operand register RB is stored. The RAI(302a, 302b, 302c, 302d) has the same physical construction as that of the RBI, and stores location information (this is defined as the instruction ID) in the instruction buffer 300 where the instruction for generating the value of the operand register RA is stored. ER (303a, 303b, 303c, 303d) stores the predicted execution result. The RB (304a, 304b, 304c, 304d) stores the register number for the operand register RA. The RA (305a, 305b, 305c, 305d) stores the register number for the operand register RB. ALU# (306a, 306b, 306c, 306d) stores the number for identifying the arithmetic and logical unit which is used by the instruction decoded by the instruction decoder 113. To control the status of the stored instruction, st (307a, 307b, 307c, 307d) has a flag bit corresponding to the status. The result (308a, 308b, 308c, 308d) stores the execution result of the instruction. TA (309a, 309b, 309c, 309d) stores the target register number of the instruction. Any one of rows in the memory, for example, the RBI 301a, the RAI 302a, the ER 303a, the RB 304a, the RA 305a, the ALU# 306a, the st 307a, the result 308a, and TA 309a are used to store one instruction. Therefore, in the example shown in FIG. 3, four instructions can be stored in the instruction buffer 300. This number of the instructions that can be stored is not intrinsically limited in the present invention and can be extended up to an arbitrary number of the instructions.

An instruction write circuit 310 writes the ALU number 204, the RT number 205, the RA number 206, the RB number 207, and a prediction result 218 all of which were sent from the instruction decoder 113 and the history cache 111 to the instruction execution control buffer 115 are written into the instruction buffer 300. Here, the prediction result 218 is a bundle of line that is formed by bundling up the execution result prediction 210 from the history cache 111 of FIG. 1 and an instruction address 219 outputted by the latch 112. When writing the above-mentioned numbers and the result, the instruction write circuit 310 sets a write-req signal to logical value '1' to inform an address decoder 311 that there is a writing request. Moreover, the instruction write circuit 310 generates data that are to be stored in the RBI (301a, 301b, 301c, 301d) and the RAI (302a, 302b, 302c, 302d). In other word, the RT number 205, the RA number 206, and the RB number 207 are inputted to the instruction write circuit 310, at the same time to the register map circuit 312, and information that by which preceding instruction the registers specified by the RA number and the RB number are generated is returned to the instruction write circuit 310 as instruction IDs, RAid 352 and RBid 353. The instruction IDs that are to be stored in the RBI (301a, 301b, 301c, 301d) and the RAI(302a, 302b, 302c, 302d) are these RAid 352 and RBid 353. Managing the empty entry of the instruction buffer 300 is done by an empty entry manage circuit 313. The empty entry manage circuit 313 outputs location information of the empty entry in the instruction buffer 300 as an instruction ID 355 based on information concerning whether or not the stored instruction exists, which is shown by all the st (307a, 307b, 307c, 307d).

A status update circuit 314 updates the information indicating whether the completion is possible or not which is shown by st (307a, 307b, 307c, 307d) each time the execution result is returned from the HEU 117 and the ALU 109. Moreover, when the execution result is returned, the instruction ID of the executed instruction (location information in the instruction buffer 300) is returned as an HEU termination signal 220, and the ALU termination signal 221, and this fact is notified to all of the RBI (301a, 301b, 301c, 301d) and RAI (302a, 302b, 302c, 302d). As will be described later, if the notified instruction ID is one that the RAI and RBI wait for as an instruction for generating the operand, the RAI and RBI update the flags for indicating that the self-controlled operands have been prepared.

An instruction issue circuit 315 examines the condition of maintenance of the all of the RBI (301a, 301b, 301c, 301d) and RAI(302a, 302b, 302c, 302d), and transfer an instruction whose operands necessary for executing the instruction are all ready to the ALU 109 or the HEU 117.

Next, details of each of parts that constitute the instruction execution control buffer 115 will be described.

Figure 4:
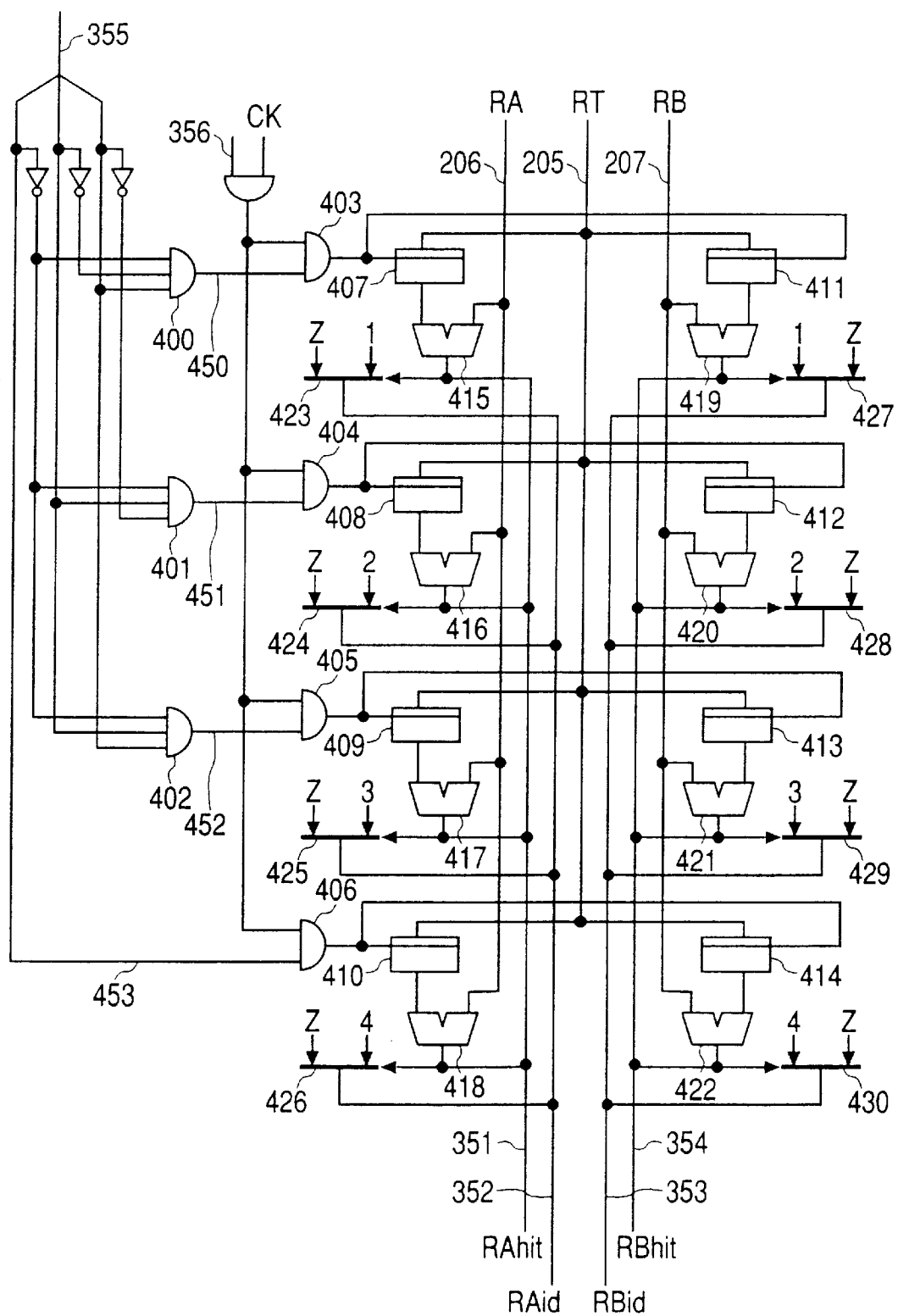
FIG. 4 is a circuit diagram of a register map circuit.

FIG. 4 is the circuit diagram of a register map circuit 312. The basic operations of the register map circuit 312 are the following two. One is registration of the RT number 205 changed through the instruction execution. When a TAwrite 356 is set to logical value '1', it means that a new instruction is registered in the instruction execution control buffer 115 and the content of the target register (RT) will be changed by the instruction in the future. The instruction ID 355 indicates an empty area inside the instruction buffer 300, and logical gates 400, 401, 402 decode the instruction ID represented by 3-bits in such a way that one bit of 4-bits becomes '1'. The reason to decode the instruction ID in 4-bits comes from a fact that the instruction buffer 300 can store four instructions. The writing clock is generated by logical gates 403, 404, 405, 406. One of the decoded instruction IDs 450, 451, 452, 453 is '1', and the RT number 205 is recorded in one of flip-flops 407, 408, 409, 410 and also in one of flip-flops 411, 412, 413, 414. The above is explanation for registration of the RT number.

In addition, the register map circuit 312 has an operand register number translation function. The operand register number is inputted as the RA number 206 and the RB number 207. Here, assume that the RA number 206 is coincident to the number held by the flip-flop 408, the coincidence is detected by a comparator 416, which sets a RAhit 351 to '1'. This detection signal further controls the selector 424, and outputs "2" to Raid 352. This means that the second instruction (in terms of a locational relation) in the instruction buffer 300 rewrites the operand register specified by the RA number 206. The relation among the flip-flop 408, the comparator 416, and selector 424 applies similarly to other groups of the flip-flop, the comparator, and the selector, (407, 415, 423), (409, 417, 425) (410, 418, 426), (411, 419, 427), (412, 420, 428), (413, 421, 429), and (414, 422, 430). Therefore, the inputted operand register number is transformed into an instruction ID (location information of the instruction buffer 300) of the instruction that rewrites it, and if no information is found through the above-mentioned retrieval, the RAhit 351 and RBhit 354 become '0'.

Figure 5:
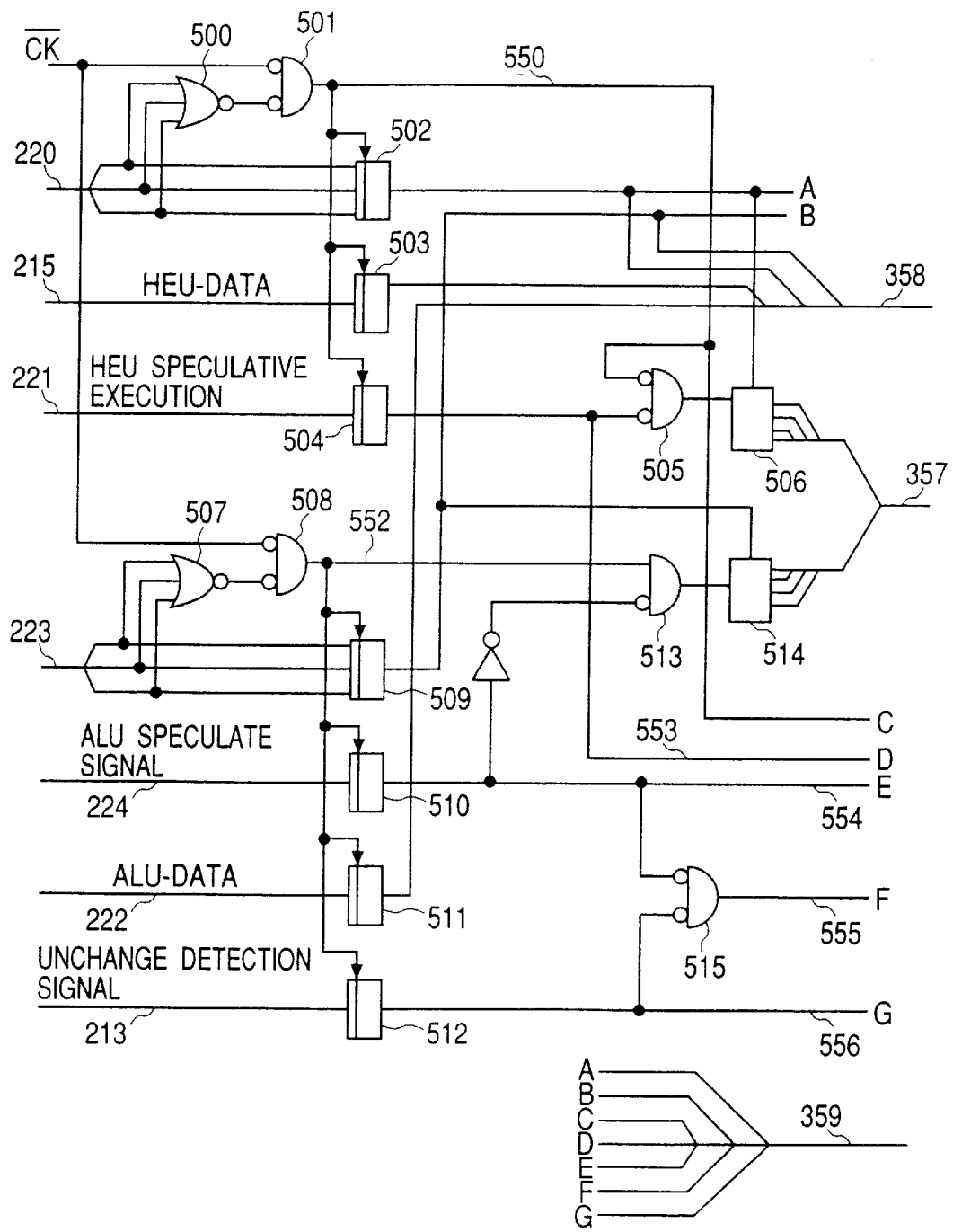
FIG. 5 is a circuit diagram of a status update circuit.

FIG. 5 is a circuit diagram of the status update circuit 314. The following signals are returned from the HEU 117 to the status update circuit 314: an instruction ID as the HEU termination signal 220; the prediction value as the execution result for to the HEU-DATA 215; and when the instruction issued to the HEU is one to be executed speculatively, a HEU speculative execution signal 221. The HEU termination signal 220 is checked to be non-'0' by logical gates 500, 501. If so, this means that the signal from the HEU 117 is valid. An output signal 550 of the logical gate 501 is used for two uses. First, the output signal 550 serves as a clock for the latches 502, 503 and latches a signal from the HEU 117. Moreover, since the output signal 500 is a signal for indicating also that the operand is decided based on the prediction, in order to inform a basis of the decision, the output signal 502 is distributed to all of the RBI (301a, 301b, 301c, 301d) and RAI (302a, 302b, 302c, 302d) together with an instruction ID 359 that is latched by a latch 502. The HEU-DATA 215 is temporarily latched by the latch 503 and then stored in the result (308a, 308b, 308c, 308d). At this time, in order to identify in which result the HEU-DATA 215 is to be stored, the instruction ID 359 are additionally distributed in a bundle of line 358. The HEU speculative execution signal 221 means that the termination result is based on the speculative prediction. A logical gate 505 generates an AND signal of a negation of the HEU speculative execution signal 221 and the output signal 550. The generated signal sets a completion-possible signal 357 at a position specified by the instruction ID to '1'.

An ALU termination signal 223 sent from the ALU 109 is detected to have 'non-0' by the logical gates 507, 508 and an output signal 552 is generated. The output signal 552 serves as a clock for the latches 509, 510, 511, 512. When an ALU speculation signal 224 is '0' (513), the instruction execution results doesn't include a predictive element and hence the completion of the instruction is possible. This condition is judged by the logical gate 513 and its result is distributed by a demultiplexer 514. When the instruction terminated by the ALU is not for speculative execution and the result doesn't coincide with the past prediction result, the logical gate 515 executes the instruction in the so-called normal manner and generates a signal 555 assuming that the completion of the instruction has been made possible. Each of signals 550, 553, 554, 555, 556 indicates a generation factor of the operand generated by the ALU 109 or the HEU 117, and all of those signals are bundled up in a bundle of line 359 and used to change a status flag in the RBI (301a, 301b, 301c, 301d) and the RAI (302a, 302b, 302c, 302d).

Next, referring to FIGS. 6, 7, and 8, the operation of an instruction issue circuit and a construction of the circuit will be described. FIG. 6 is a table showing a relation between the status of the instruction waiting in the instruction execution control buffer 115 and the operation of the instruction issue circuit 315. A term "D completion" in the table represents that the operand has been completed when the instruction is dispatched from the instruction decoder 113 to the instruction execution control buffer 115. A term "speculation completion" means that any of the preceding instructions having the data dependency including the pertinent instruction has been executed speculatively and suggests a potential that the content of the operand may be erroneous. A term "unchanging completion" means that the result executed by the ALU is coincident to the prediction result or the prediction value, as it is, is outputted as the execution result by the HEU to effect the completion of the operand. A term "usual completion" means that the operand is completed with means other than "D completion", "speculation completion" and "unchanging completion". In the normal execution of the processor, since the operand has been already completed at the time of dispatching (D completion) or the operand will be completed after the preceding instruction is terminated (usual completion), statues shown in the four corners of the table are established, that is, the operation of only issuing the instruction to the ALU is executed. In the conventional technology where the speculative execution can be performed, only the status "speculation only" is added to the table, whereas the present invention is characterized in that the status "unchanging completion" is provided in the conditions of the operand completion, whereby the conflicting on the ALU and congestion thereof can be avoided by not using the ALU but by issuing the instruction to the HEU instead.

Figure 7:
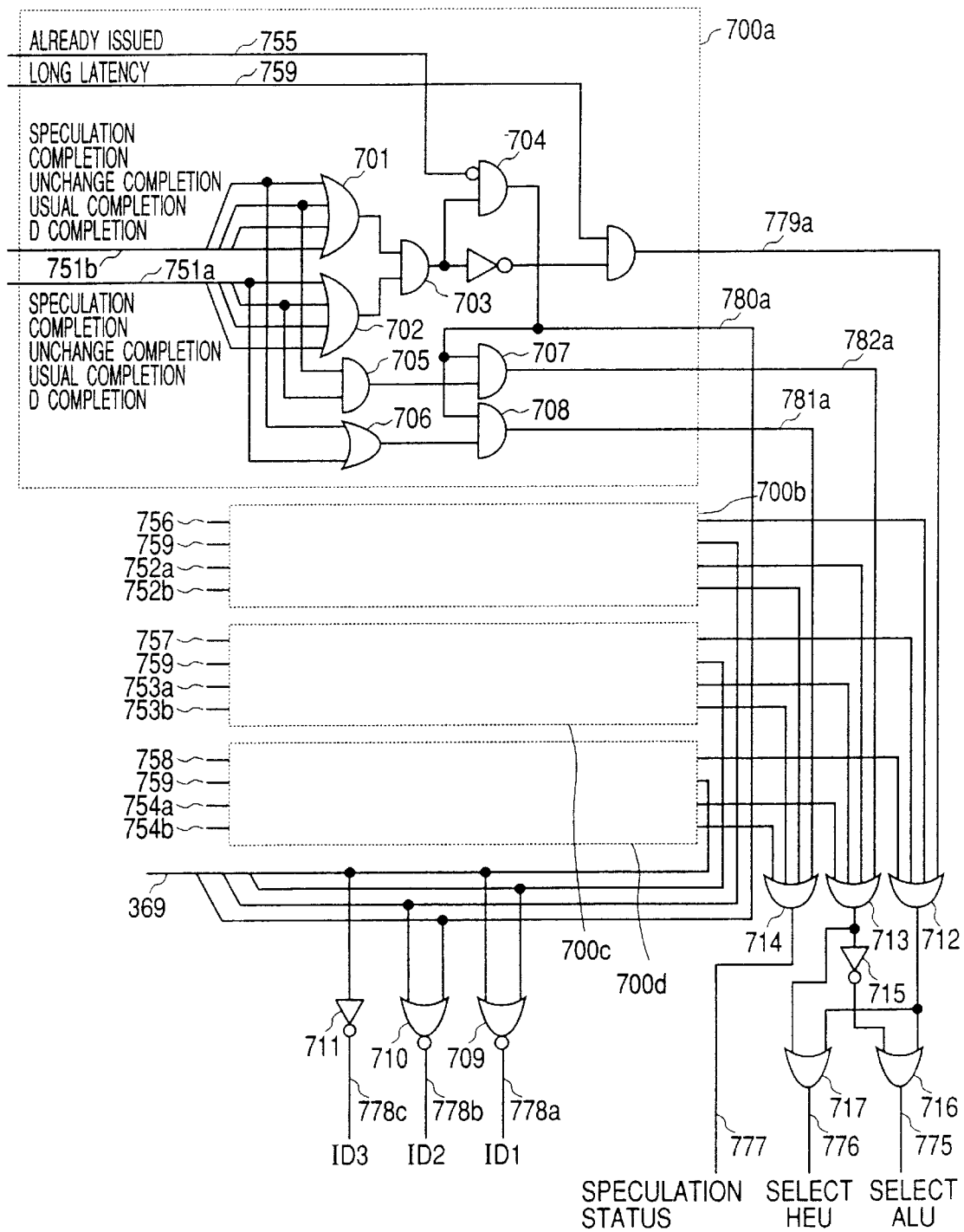
FIG. 7 is a circuit diagram of the instruction issue circuit.
Figure 8:
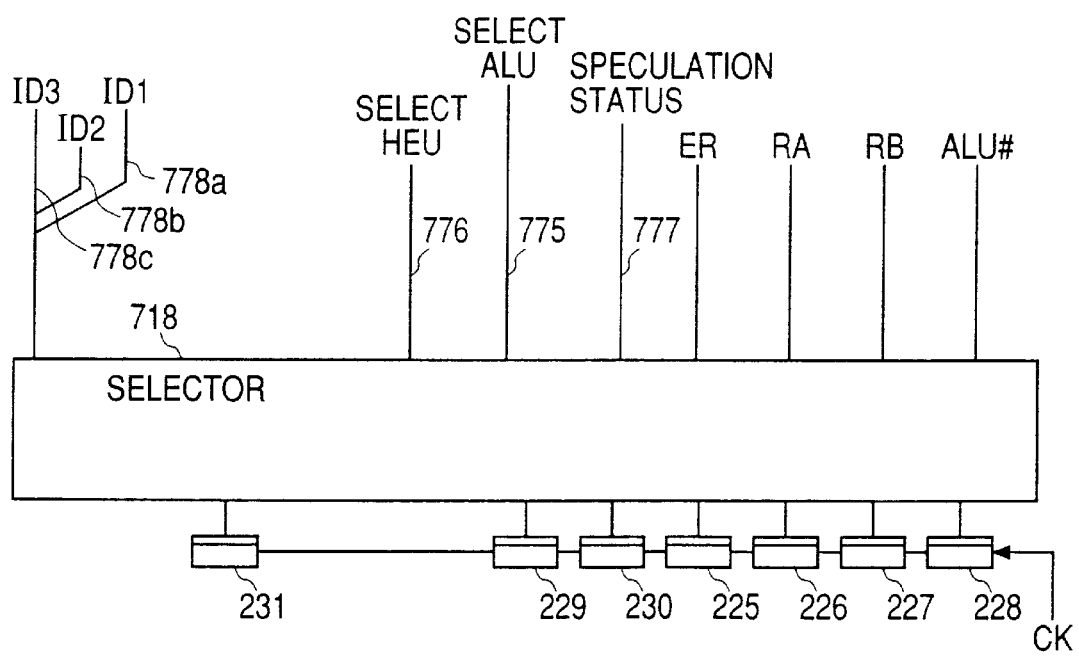
FIG. 8 is a circuit diagram of the instruction issue circuit.

FIG. 7 is the circuit diagram of the instruction issue circuit 315. Issuable-condition judgment circuits 700a, 700b, 700c, 700d correspond to four instructions which can be stored in the instruction buffer 300, respectively, and have the same internal circuit; therefore only the issuable-condition judgment circuit 700a will be described. The logical gates 701, 702, 703 judge a condition that can issue the instruction from the completion conditions (751a, 752a, 753a, 754a) and (751b, 752b, 753b, 754b) of the operand inputted form the IRA. That is, when the two operands are completed by either of factors, the instruction issue circuit 315 becomes able to issue the instruction. However, because any instruction already issued cannot be issued again, the logical gate 704 judges that an instruction issue flag held by the st(307a, 307b, 307c, 307d) is '0' and an issue signal 780a is generated. Moreover, when the instruction to be issued is a long-latency instruction, a double issue signal 779a is generated from the long-latency signal 759, because the instruction is issued to both the ALU 109 and the HEU 117. When "speculation completion" and "unchanging completion" are included in determining factors of the operand, the speculative execution signal 781a and an unchanging execution signal 782a are generated by the logical gates 705, 706, 707, 708.

Even when two or more instructions can be issued, this instruction issue circuit is configured to issue only one instruction. The issue signals 780a, 780b, 780c, 780d are encoded into priority-conditioned three-bit signals 778a, 778b, 778c by logical gates 709, 710, 711. Moreover, logical gates 712, 713, 714, 715, 716 generate an ALU selection signal 775 and an HEU selection signal 776 which indicate which arithmetic and logical unit is to be used, the ALU 109 or the HEU 117, and a speculation-status signal 777 for indicating that the instruction execution is performed speculatively. Since the status of the issued instruction may change in the instruction buffer 300, a signal 369 for setting the issued flag is outputted to the instruction buffer 300. The circuit diagram continues to FIG. 8. Selection circuit 718 of FIG. 8 selects one of four choices for ALU# (759c, 760, 761, 762), RA (763, 764, 765, 766), RB (767, 768,769, 770), and ER (771, 772, 773, 774), respectively, based on the signals 778a, 778b, 778c indicating which instruction is an instruction to be issued, and further decides issue destination based on the ALU selection signal 775 and the HEU selection signal 776.

Figure 9:
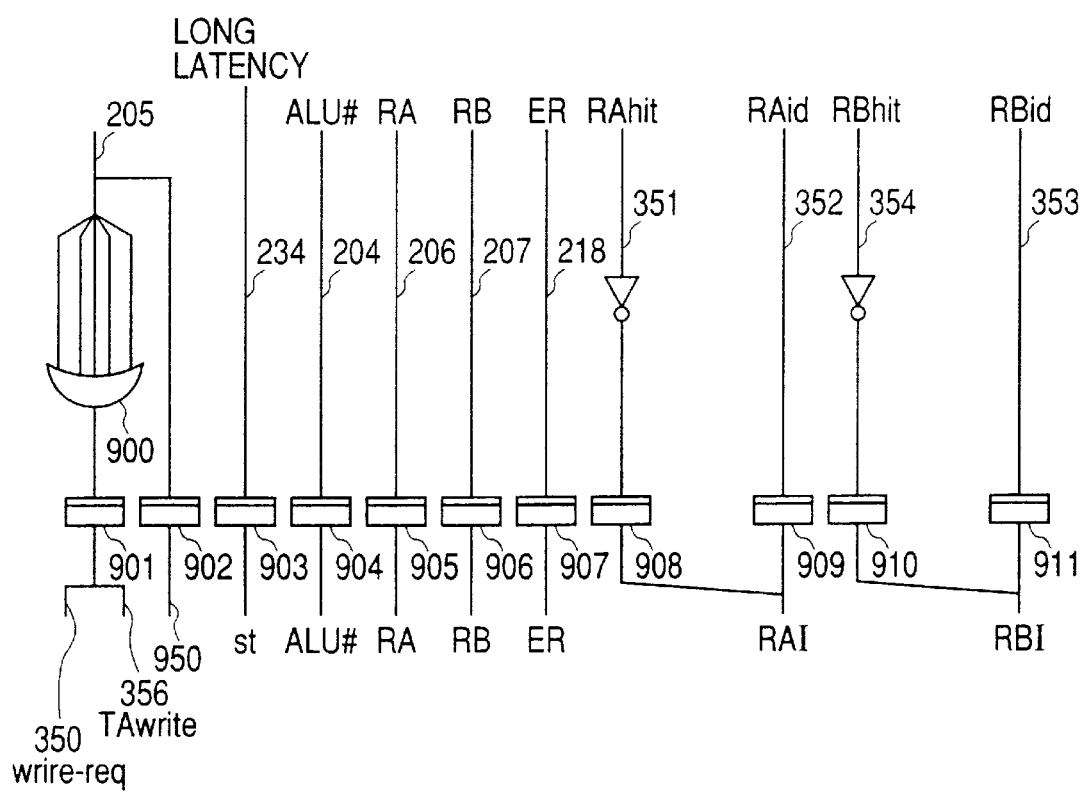
FIG. 9 is a circuit diagram of an instruction write circuit.

FIG. 9 is the circuit diagram of the instruction write circuit 310. This circuit has a function of only writing information concerning the instruction that is dispatched by the instruction decoder 113 into the instruction buffer 300 and doesn't have any complicated logical functions. In this embodiment, an instruction having a target register number other than zero is valid. A logical gate 900 examines this non-zero condition and generates the TAwrite signal 356, and a write-req signal 350. These two signals are the identical signal. Other signals are temporarily latched by latches 901, 902, 903, 904, 905, 906, 907, 908, 909, 910, 911 and outputted as signals to be written in the instruction buffer 300. However, since values to be written in the RAI and RBI cannot be given as information of the instruction, RAid 352 and RBid 353 are used as information of the instruction ID at which the instruction should wait, respectively. Moreover, the RAhit 351 and RBhit 354 mean that retrieval made a hit in the register map circuit 312. Therefore, if the retrieval made no hit, it means that the operand has already been completed and the RAhit 351 and RBhit 354 serve as signals for setting the later-described D completion flags of the RAI and RBI to '1', respectively. Thus, in the instruction write circuit 310, initial values of the st (307a, 307b, 307c, 307d), the RAI (302a, 302b, 302c, 302d), and the RBI (301a, 301b, 301c, 301d) are fixed. Moreover, a long-latency flag in the st (307a, 307b, 307c, 307d) is directly set by a signal 234. Although being not shown in the circuit diagram, a already-issued flag and the completion-possible flag, which are the flags of the st, are initialized to '0' and a RS-in-use flag is initialized to '1'. Further, the speculation completion flag of the RAI and RBI, the usual completion flag, and the unchanging completion flag are initialized to '0'.

Figure 10:
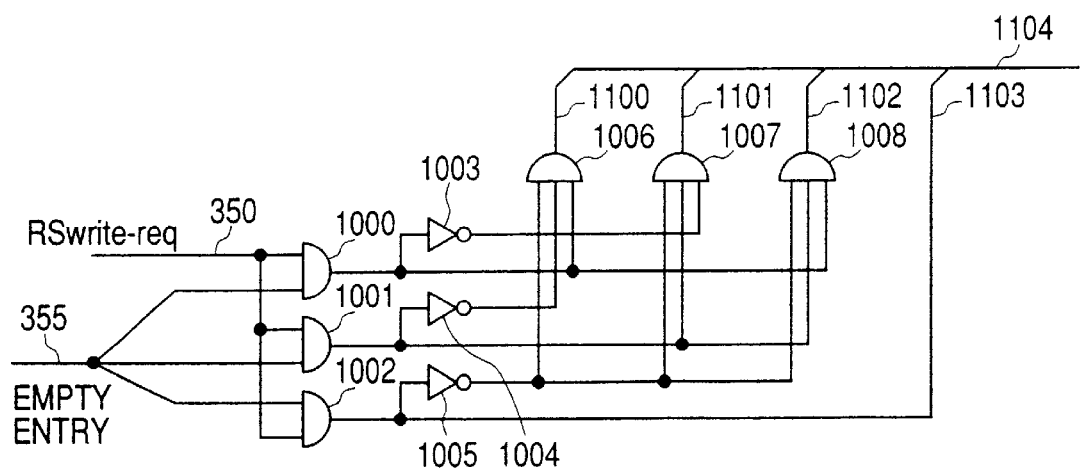
FIG. 10 is a circuit diagram of an address decoder.
Figure 11:
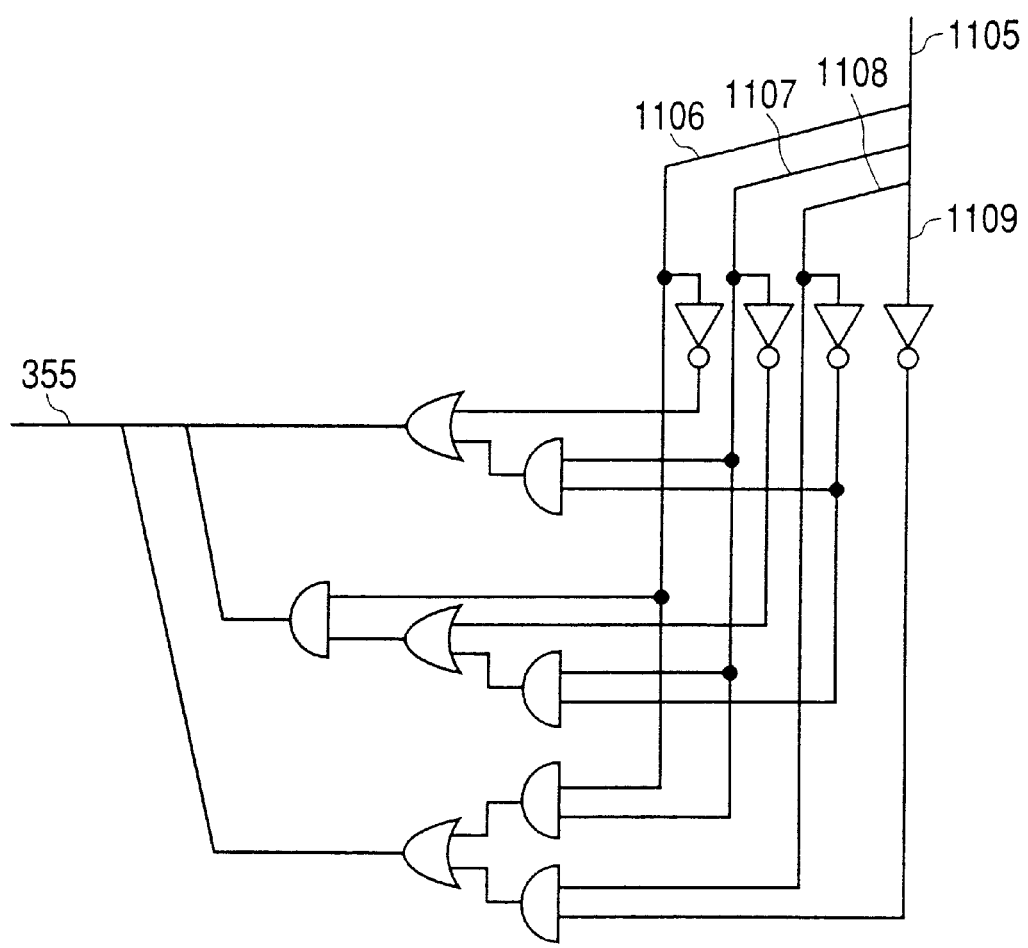
FIG. 11 is a circuit diagram of an empty entry manage circuit.

FIG. 10 is a circuit diagram of the address decoder 311. The empty entry manage circuit 313 indicates a writable location in the instruction buffer 300 with a 3-bit bundle of line. Logical gates 1000, 1001, 1002, 1003, 1004, 1005, 1006, 1007, 1008 decode this three-bit signal in such a way that one of writing signals 1100, 1101, 1102, 1103 is set to '1'. The writing signals 1100 to 1103 are drawn collectively in a bundle of line 1104 for the convenience of space. A circuit diagram of the empty entry manage circuit 313 is shown in FIG. 11. The RS-in-use flag inside the st (307a, 307b, 307c, 307d) is always being outputted as signals 1106, 1107, 1108, 1109. These signals become inputs of the empty entry manage circuit 313 as a bundle of line 1105 in the figure. Therefore, if any one of the flags become '0', the instruction ID is outputted in a form encoded in 3-bits. When there is no empty entry in the instruction buffer 300, the instruction ID 355 becomes '0'.

Figure 12:
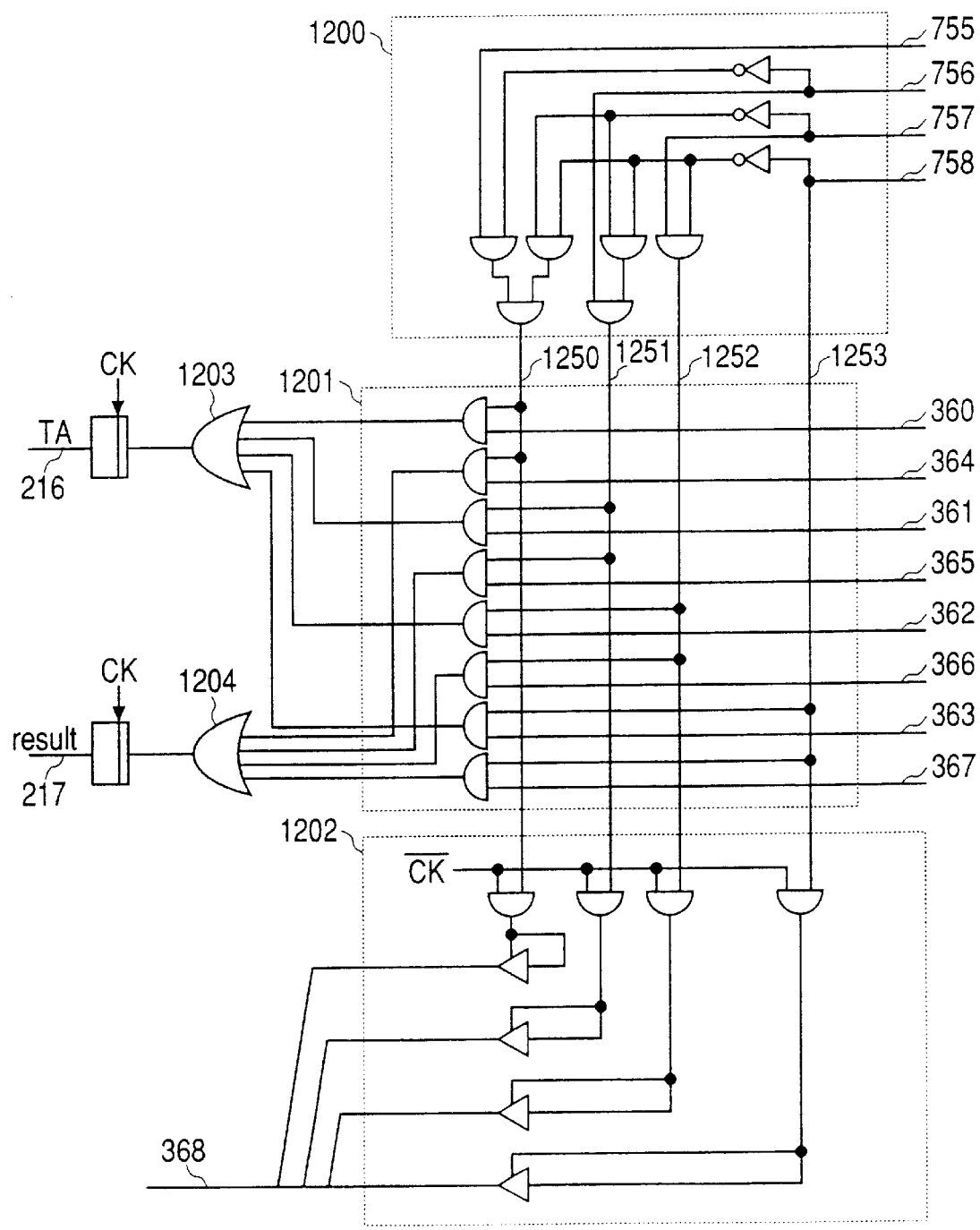
FIG. 12 is a circuit diagram of a completion circuit.

FIG. 12 is a circuit diagram of a completion circuit 316. Status information (755, 756, 757, 758) held by the st (307a, 307b, 307c, 307d) of the instruction buffer 300 are inputted into the complete detect circuit 1200, which selects an instruction whose completion-possible flag has been set to '1'. At this time, since there is a possibility that a plurality of completion-possible flags have been set to '1', the completion-possible flags are prioritized, so that any and only one of the selection signals 1250, 1251, 1252, 1253 is set to '1'. An instruction information select circuit 1201 selects a target register (360, 361, 362, 363) and the result (364, 365, 366, 367) which is the operation result among the instruction information held by the instruction buffer 300 in accordance with the selection signals 1250, 1251, 1252, 1253. The selection results concerning the target register are summarized at a logical gate 1203 and outputted as the completion register number 216. The operation results are summarized at a logical gate 1204 and outputted as the completion data 217. An instruction buffer reset circuit 1202 generates a signal 368 for resetting the RS-in-use flag that is held in the st (308a, 308b, 308c, 308d) to '0' for the instruction that has been completed.

Figure 13:
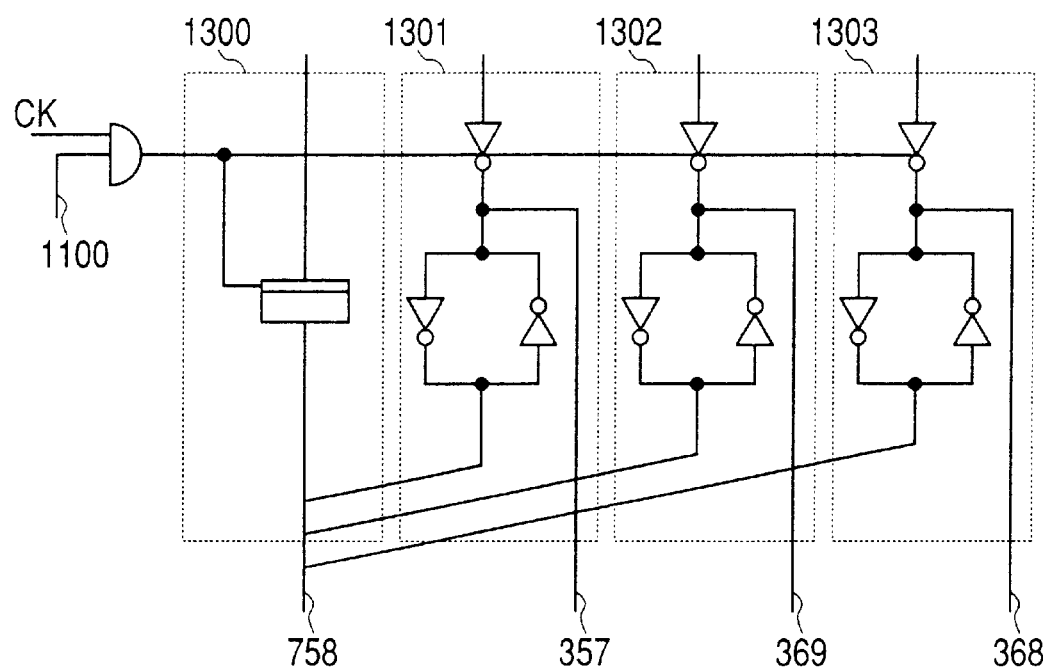
FIG. 13 is a circuit diagram of a st circuit.

FIG. 13 is a circuit diagram of the st (307a, 307b, 307c, 307d) in the instruction buffer 300. Structurally, four circuits are the identical circuits. A long-latency flag holding circuit 1300 holds the long-latency flag for indicating that the waiting instruction is a long-latency instruction. Since this flag information is an attribute of the instruction and cannot be rewritten specifically, this information is held by means of a normal latch. A completion-possible flag 1301 is set to '1' by the status update circuit 314 when the completion of the instruction becomes possible. An initial value is set to '0' by the instruction write circuit 310, and the held value is rewritten to '1' forcibly by using a signal line 357. An already-issued flag 1302 is set in the same circuit as for the completion-possible flag 1301. An initial value is '0', and when the instruction is issued by the instruction issue circuit 315, it is set to '1'. Moreover, when the instruction execution is terminated, the already-issued flag is reset to '0' by the status update circuit 314. This is done because the instruction executed speculatively may be issued again when the prediction goes wrong. An RS-in-use flag 1303 indicates that the entry of the instruction buffer is busy. When the instruction has been completed, the RS-in-use flag 1303 is reset to '0'.

Figure 14:
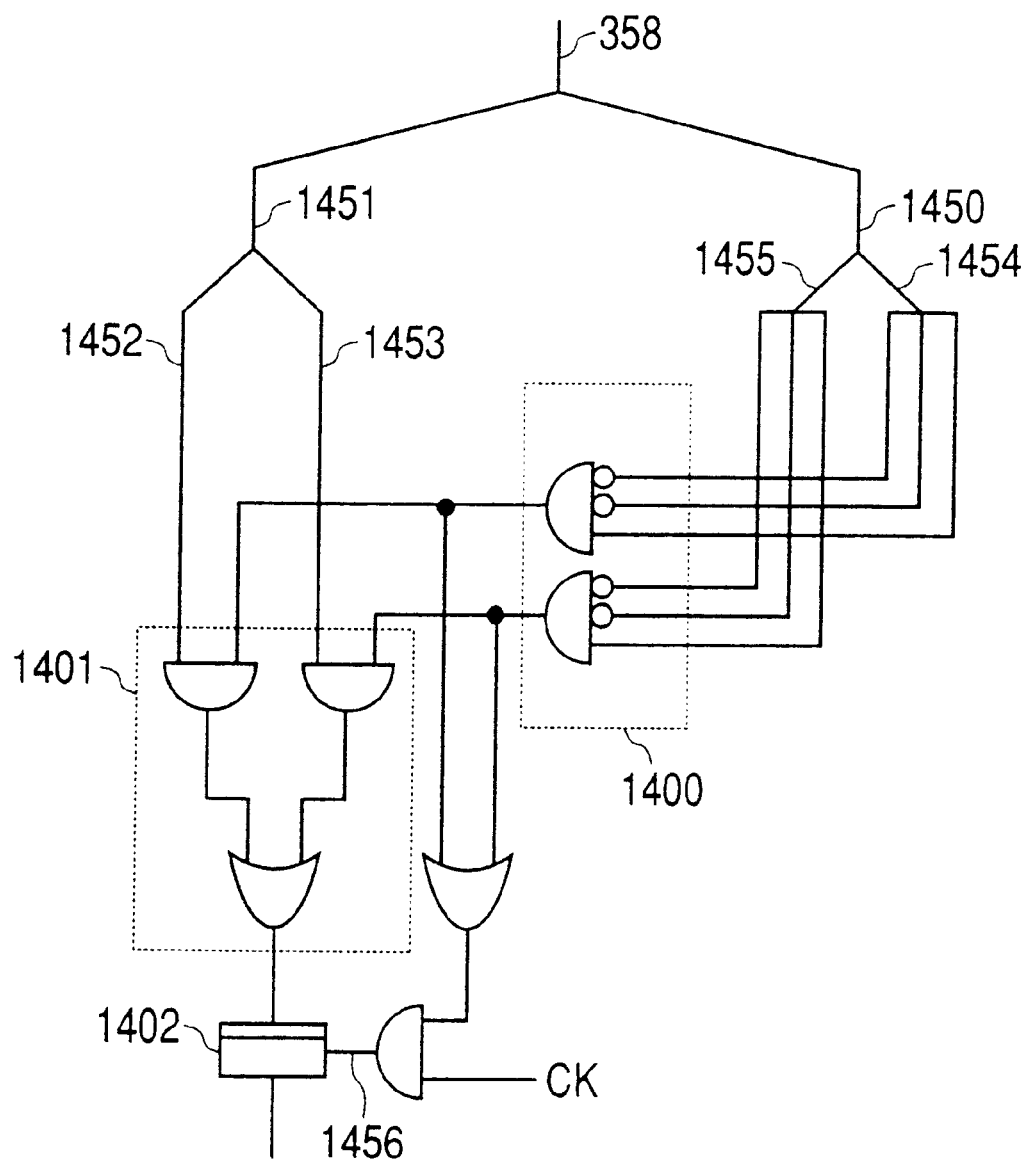
FIG. 14 is a circuit diagram of a result cell.

FIG. 14 is a circuit diagram of the result (308a, 308b, 308c, 308d). Four circuits are the same except only that an address decoder 1400 of each circuit differs from those of the other circuits according to the position thereof in the instruction buffer 300. In FIG. 14, an example of the result 308a is shown. Signals 358 sent from the status update circuit 314, which are shown by a bundle of line in FIG. 14, consist of an instruction ID 1450 for indicating a location of the instruction whose execution has been terminated and result data 1451 that is data of the operation result of the instruction. Moreover, it may occur that the status update circuit 314 processes two instructions at maxim, from the ALU 109 and the HEU 117 (writhing into the result must be only one), so the instruction ID 1454 of the instruction terminated by the ALU, an instruction ID 1455 of the instruction terminated by the HEU 117, and data 1452, 1453 from the ALU and the HEU become components of a bundle of line. The information processor in this embodiment treats the data as 32-bits. A roll of the result is only for holding the data, and when the address decoder 1400 decodes the address to find that it is a writing request to the result 308a, a writing clock 1456 is generated. Data is selected by a selector 1401 and stored in a latch 1402.

Figure 15:
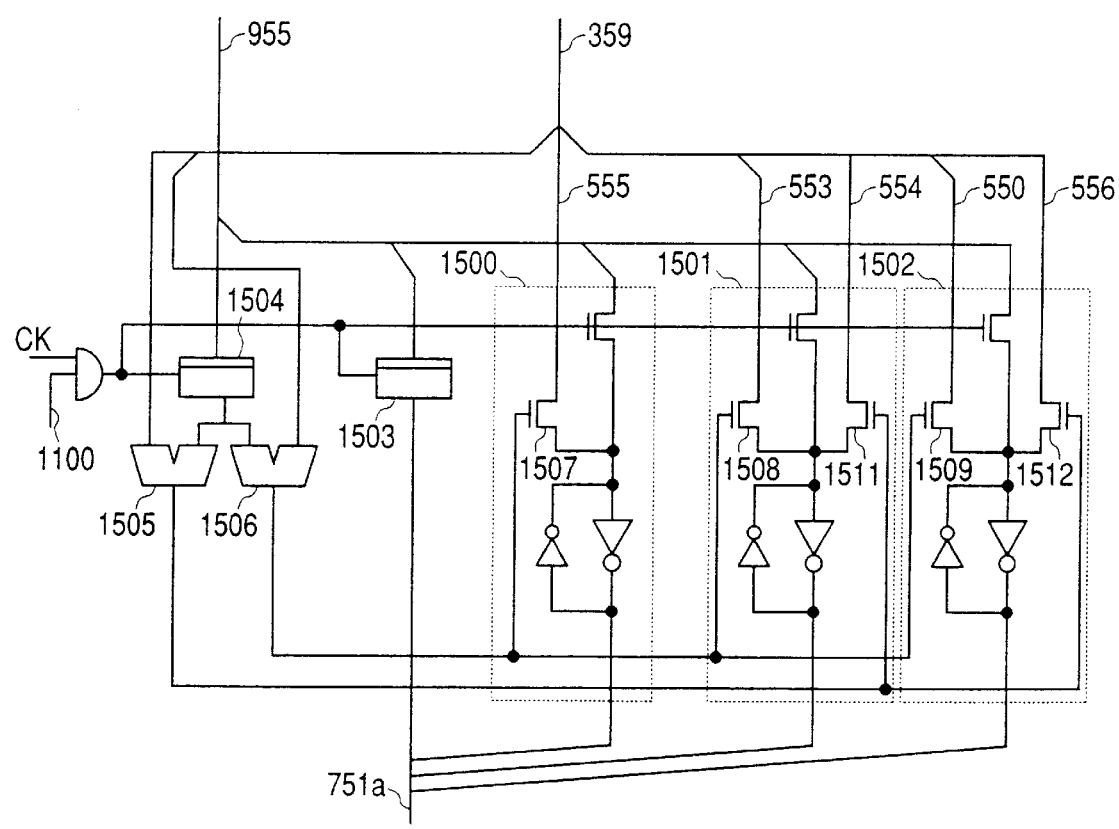
FIG. 15 is a circuit diagram of a RAI and a RBI.

FIG. 15 is a circuit diagram of the RAI(302a, 302b, 302c, 302d) and the RBI (301a, 301b, 301c, 301d). These eight circuits are all identical and description will be given taking the RAI 302a for example. The RAI 302a is composed of a latch 1504 for holding the instruction ID of the instruction waiting for the termination as an operand, a D completion flag 1503, a usual completion flag 1500, a speculation completion flag 1501, and an unchanging completion flag 1502. The status update circuit 314 outputs the instruction ID of the terminated instruction on the signal line 359. There may exist two instructions to be terminated at maximum, one that is terminated by the ALU 109 and one that is terminated by the HEU 117. This instruction ID is compared with the content of the latch 1504 by comparators 1505, 1506, and when the coincidence is obtained, writing transistors 1507, 1508, 1509, 1511, 1512 of the usual completion flag 1500, the speculation completion flag 1501, and the unchanging completion flag 1502 are made to be open and the content of each of those flags are rewritten to the content outputted by the status update circuit.

Figure 16:
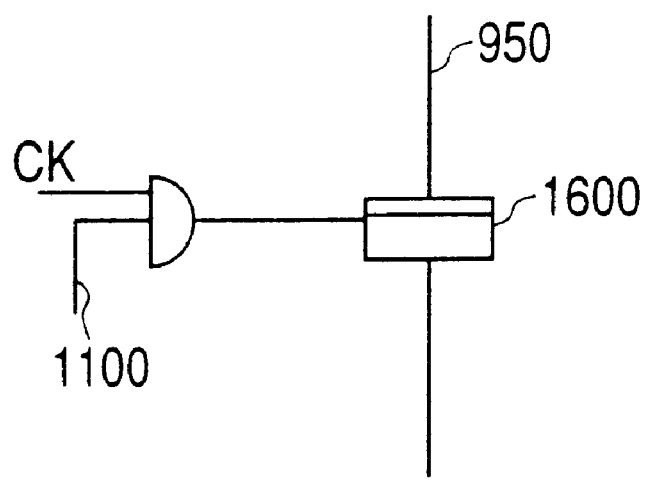
FIG. 16 is a circuit diagram of a storage element of an instruction buffer.

The circuit diagram of FIG. 16 is a circuit diagram of the TA (309a, 309b, 309c, 309d), the RA (305a, 305b, 305c, 305d), the RB (304a, 304b, 304c, 304d), the ALU# (306a, 306b, 306c, 306d), and the ER (303a, 303b, 303c, 303d), and since twenty circuits are all identical, the TA 309a will be described as an example. A target register number 950 is composed of 5-bits, and when the writing selection signal 1100 is '1', the target register number 950 is taken into a latch 1600.

By the circuits described above, the instruction execution control buffer 115 makes the following instruction having the data dependency wait until the preceding instruction is terminated. When the preceding instruction is terminated, the ALU 109 sends the result to the instruction execution control buffer 115, and at the time when necessary operands are all ready the following instruction is issued to either the ALU 109 or the HEU 117. In this series of operations, the execution result of the ALU 109 is compared by the execution result comparing unit 116, and when the coincidence is obtained, the following instruction is issued to the HEU 117. The HEU 117 is an arithmetic and logical unit that only outputs the past execution result of the instruction, as it is, omitting the actual instruction execution. In addition to this, any instruction whose execution time is long such as the load instruction is issued to both the ALU and the HEU without being made to wait for the preceding instruction to terminated in the instruction execution control buffer 115. When the instruction is issued to the HEU, the following instructions are also keep being executed in the HEU. If the execution result of the load instruction by the ALU is coincident to the prediction, all the following instructions executed by the HEU become complete-possible. If the coincidence is not obtained, the instruction is executed again. Thus, when the prediction based on the past history is found to be correct for a certain instruction, there is a high possibility that the past history, as it is, can be the execution result also for the following instruction; therefore the congestion of the ALU that occurs by a process where an execution result of a certain instruction is predicted and then a following instruction is executed speculatively by using the ALU, as is the case of the conventional technology, can be mitigated.

Figure 17:
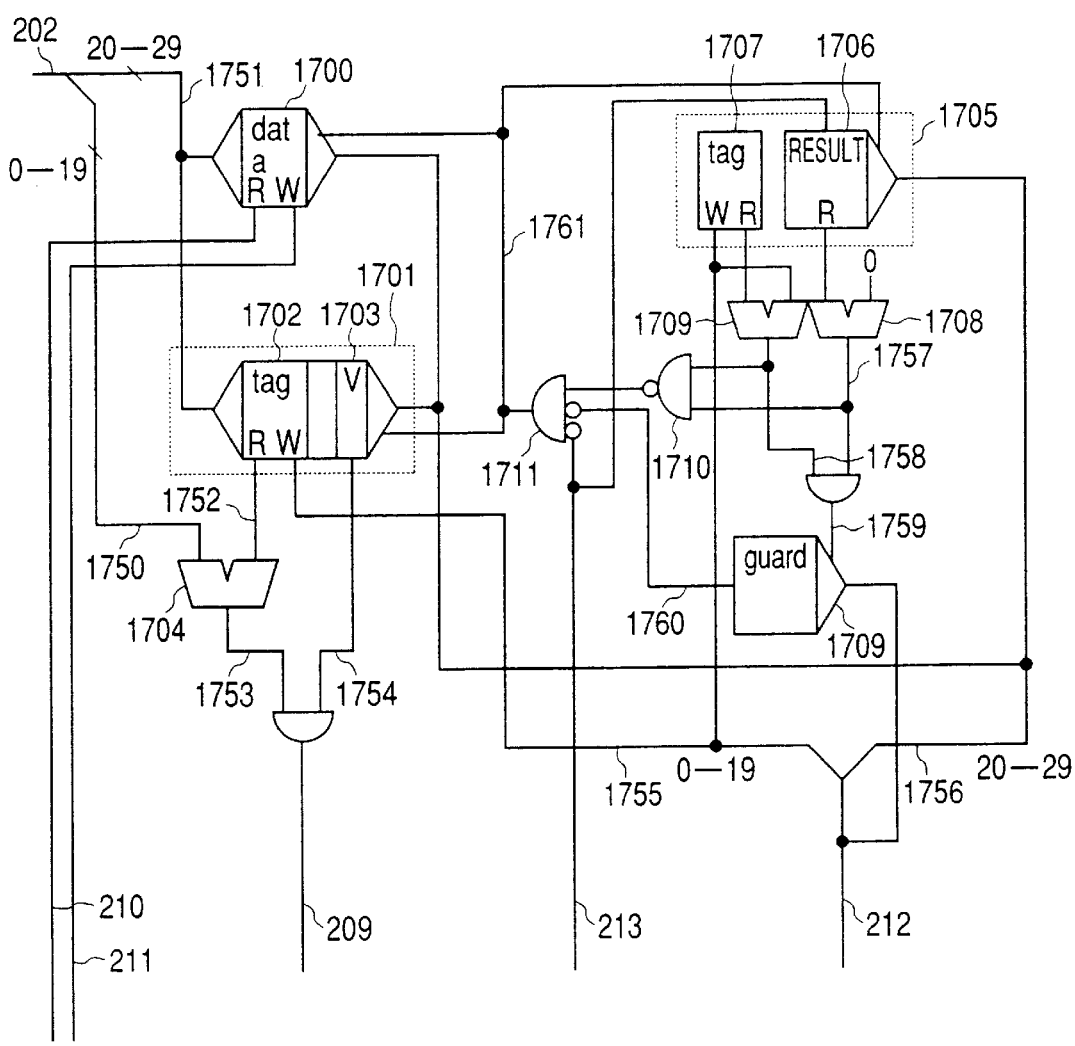
FIG. 17 is a circuit diagram of a history cache.

Next, referring to FIG. 17, the circuit of the history cache 111 will be described. The instruction address 202 is composed of 32-bits. If the instruction words are arranged in four-byte boundaries, one instruction can be addressed with 30-bits. Provided that the zero-th bit is the most significant bit, the 30-bits can be divided into two portions: the 0th to 19th bits for a tag portion; and the 20th to 29th bits for a set address portion. Data memory 1700 is two-port memory which is simultaneously readable/writable, and when a set address 1751 is inputted, the data memory 1700 outputs the content stored in the memory as the execution prediction result 210. Tag memory 1701 is also two-port memory which is simultaneously readable/writable. When the set address 1751 is inputted in a tag part 1702, tag information corresponding to the upper address of the instruction address appears at an output 1752. The tag information is compared to the upper address of the instruction address by a comparator 1704, and when the coincidence is obtained, a tag-coincidence signal 1753 is outputted. A flag part 1703 stores a bit for indicating validity of the tag information read with the use of the set address 1751. Here logical value '1' indicates the validity, and when both the previous tag-coincidence signal 1753 and readout flag information 1754 are both '1', the history cache hit signal 209 is outputted.

The above is an explanation concerning reading of the history cache. An instruction-execution-result prediction signal 225 that is outputted by the instruction execution control buffer 115 when issuing the instruction is composed of the instruction address 212 and the prediction data part 214. An address of the instruction terminated by the ALU 109 is inputted into the history cache 111 as the instruction address 212 of the executed instruction, and the data of the execution result is inputted as the ALU-DATA 211. The instruction address is separated into a tag part 1755 and a set address part 1756 as in the case of the cache reading. Result control memory 1705 is composed of a result record part 1706 and a tag control part 1707. A prediction result corresponding to the set address 1756 is read as a value from the result record part 1706 and is collated by a comparator 1708 whether or not the prediction result value is '0'. A collation result is outputted as a low-result signal 1757. On the other hand, the upper address of the instruction address is read from the tag control part 1707 and is verified whether or not the prediction result information read by a comparator 1709 is one related to the instruction address 212. The output of the comparator 1709 is outputted as a result-existence signal 1758. When these two signals are both '1', a Guard-cache-writing signal 1759 is generated.

A Guard cache 1709 is full-associative association memory which outputs at its output 1760 '1' when the instruction address 212 is registered, and '0' when the instruction address 212 is not registered. Moreover, when the Guard-cache-writing signal 1759 is '1', the instruction address 212 is registered. Logical gates 1710, 1711 generate a writing signal 1761 to the data memory 1700, the tag memory 1702, and the result control memory 1705. When the writing signal 1761 is '1', the content of the ALU-DATA 211 that is the execution result of the instruction is written in the data memory 1700, the tag part 1755 of the memory address is written into the tag memory 1701, and at the same time '1' is written into the flag part 1703. When the unchanging detection signal 213 is '1', the result record part 1706 of the result control memory 1705 increments the holding value by the amount of +1 and writes it; when being '0', the result record part 1706 increments the holding value by the amount of −1 and writes it. The tag part 1755 of the instruction address is written into the tag control part 1707. When the instruction address 212 is registered in the Guard cache 1709, since '1' is outputted to the output 1760; therefore the writing signal 1761 to the data memory 1700, the tag memory 1702, and the result control memory 1705 becomes '0'. Consequently, the execution result of the instruction whose address has been registered in the Guard cache 1709 is not written in the data memory 1700.

Here, the history cache 111 described above is put in order in terms of the operation as follows. When the instruction execution result is returned from the ALU, if the instruction has already been registered in the history cache and the prediction result is not excellent (the result value being '0'), the instruction address is registered to the Guard cache. Any instruction address once registered in the Guard cache won't be registered in the data memory 1700 again. Moreover, the instruction that has been registered in the history cache and gives a high prediction accuracy is used to update the data memory 1700 unless the instruction has been registered in the Guard cache. Naturally, any instruction that has not been registered in the history cache is registered to the data memory 1700. Thus, by controlling instructions that are disadvantageous for the prediction operation with the Guard cache 1709, higher prediction accuracy can be obtained with less cache resource.

Figure 19:
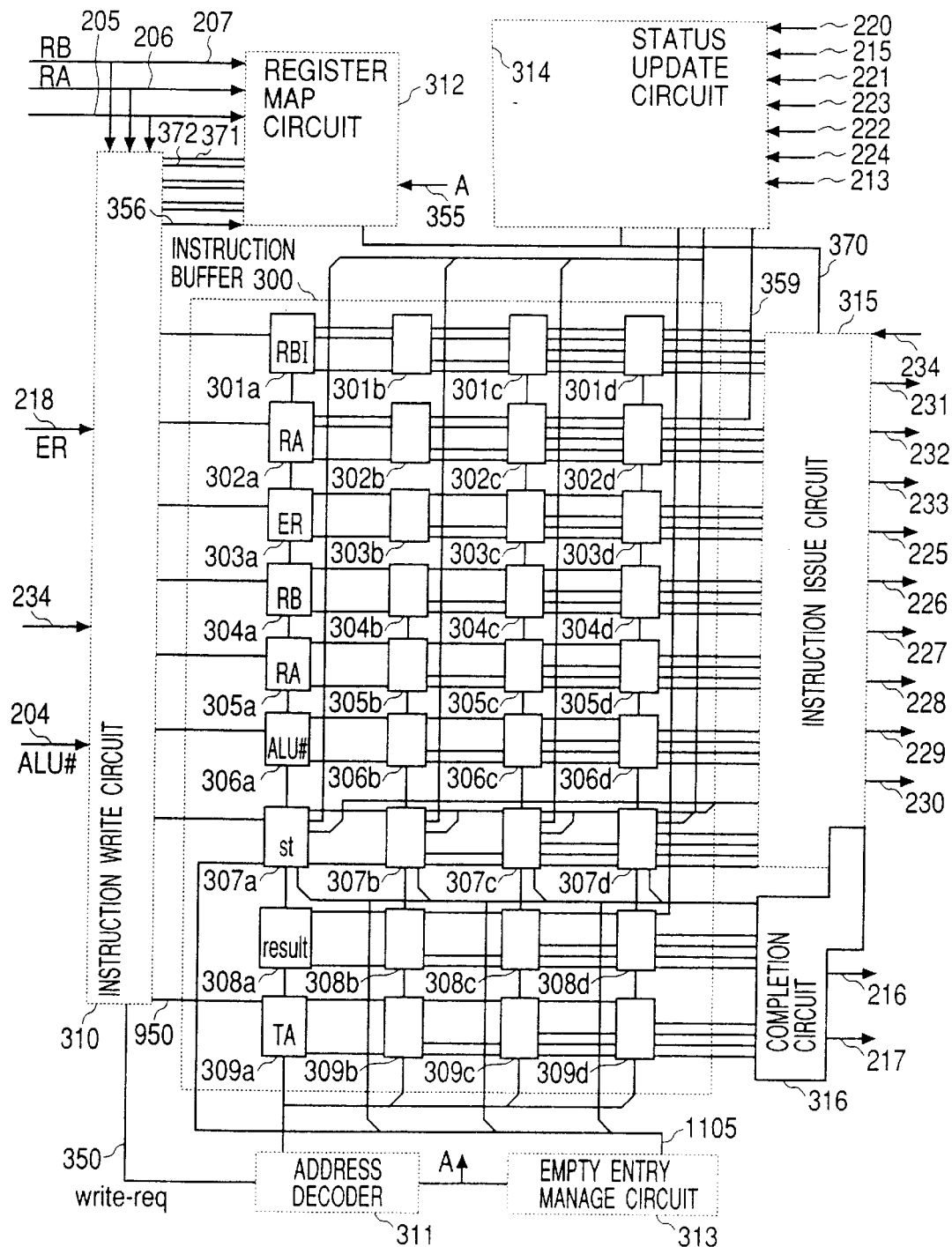
FIG. 19 is a circuit diagram of a RAI and a RBI in a variant embodiment.
Figure 20:
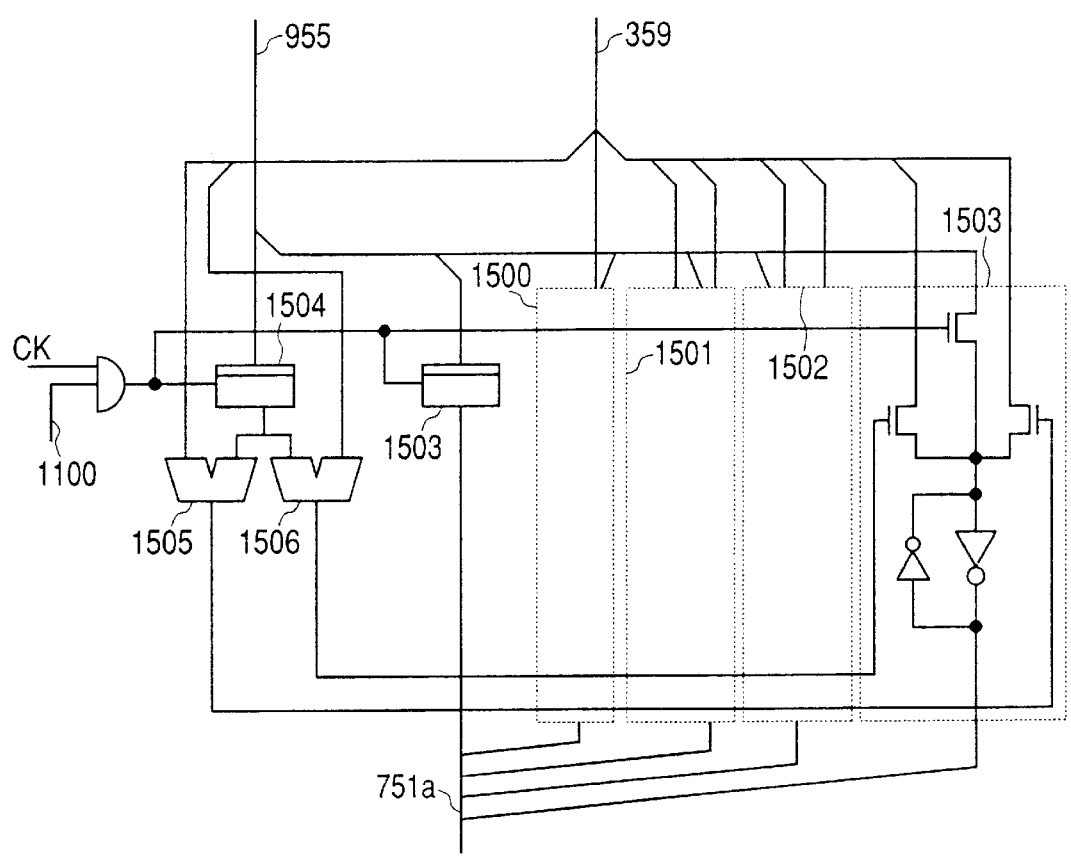
FIG. 20 is an instruction execution control buffer in the variant embodiment.

It should be noted that in the above-mentioned embodiment, for only the kind of instruction having a long execution latency such as the load instruction, the speculative execution based on the prediction is performed. However, assuming a period from the instruction decoding to the execution termination of the instruction as the latency of the instruction, it is preferable that an instruction having the possibility of being stopped in the instruction execution control buffer for a long time also should be considered as the object of the speculative execution based on the prediction. That is, the instructions waiting in the instruction execution control buffer consists of: instructions waiting for the execution of the issued instruction to be terminated; and instructions waiting for a not-issued instruction to be issued and for the termination of its execution. Since the latter instruction is considered to have a long waiting time until being executed, this kind of instruction is treated as the object of the speculative execution based on the prediction in a variant embodiment that will be described in this paragraph. Concretely, as shown in FIG. 19, the instruction issue circuit 315 transmits the target register number of the to-be-issued instruction and the instruction ID that serves as location information of the to-be-issued instruction in the instruction buffer 300 to the status update circuit 314 and the register map circuit 312 as an issue termination signal 370. The status update circuit 314 informs the instruction ID of the issued instruction to the whole of the RAI (302a, 302b, 302c, 302d) and the RBI (301a, 301b, 301c, 301d). RAI (302a, 302b, 302c, 302d) and RBI(301a, 301b, 301c, 301d) modified for this purpose can be realized, as shown in FIG. 20, by adding an issue status holding circuit 1503 for indicating that the preceding instruction has already been issued to the circuit shown in FIG. 15. The instruction issue circuit 315 examine the content of the issue status holding circuit concerning the to-be-issued instruction and then issue the instruction speculatively except for a case where both RAI and RBI indicate that the preceding instruction has been issued. Moreover, there may be a case, for certain instructions, where the preceding instruction has been issued occasionally before the instruction is registered to the instruction execution buffer. The issue termination signal 370 is also inputted into the register map circuit 312 and the target register number of the issued instruction is informed by the instruction issue circuit 315. If regarding the operand register of the instruction that is intended to be registered in the instruction execution control buffer, its preceding instruction has already been registered, '1' is returned to an RA-already-issued signal 371 and an RB-already-issued signal 372. When the instruction write circuit 310 writes an instruction whose preceding instruction has already been issued in the instruction buffer 300, it sets the already-issued status holding circuit to '1'. Thus, it is also possible to include an instruction that stops in the instruction execution control buffer for a long time in the instructions that are the objects of the speculative execution based on the prediction.

According to the present invention, the execution result is predicted based on the past history and when the past history is coincident to the actual execution result, the following instruction is processed by the HEU rather than executed speculatively by the ALU. This execution scheme can avoid a problem entailed by the conventional technology that the ALU is used by the following instruction when executing the operation speculatively and the same ALU is likely to be used by that instruction when executing the operation again, which may cause the congestion of the ALU, hence hampering the execution of other instructions.

In addition, by providing the result control memory for controlling the prediction accuracy and the Guard cache for recording the instructions that give low prediction accuracy in the history cache, the history cache is prevented from being used wrongly by the instructions that give low prediction accuracy. With the information processor described in the foregoing, the following instruction can be executed without waiting for the execution termination of the preceding instruction, and consequently the total processing time can be shortened.

What is claimed is:

1. An information processing device, comprising:
   (a) an arithmetic and logical unit for executing instructions;
   (b) a storage device for storing past execution results of said instructions; and
   (c) a device for performing coincidence comparison between the execution result of one of said instructions by said arithmetic and logical unit and the past execution result of one of said instructions that is stored;
   wherein the information processor further comprises:
      (1) means for judging whether or not a preceding instruction is a predetermined instruction; and
      (2) a device for outputting the past execution result of a following instruction having a data dependency with said preceding instruction, which is stored in said storage device, without executing said following instruction when said preceding instruction is the predetermined instruction, and
   wherein said predetermined instruction is decided according to the number of execution cycles of the instruction.

2. An information processor comprising:
   (a) an arithmetic and logical unit for executing instructions;
   (b) a storage device for storing past execution results of said instructions; and
   (c) a device for performing coincidence comparison between the execution result of one of said instructions by said arithmetic and logical unit and the past execution result of said instructions that is stored;
   wherein the information processor further comprises a device for recording the frequency of coincidence between the execution result of one of said instructions by said arithmetic and logical unit and the past execution result of said one of instructions that is stored, and
   wherein the information processor further comprises a device that prevents the execution result of an instruction whose frequencies of coincidence is not more than a reference value from being stored in said storage device.

3. An information processor, comprising:
   (a) an arithmetic and logical unit for executing instructions;
   (b) a first storage device for storing past execution results of said instructions; and
   (c) a device for performing coincidence comparison between the execution result of one of said instructions by said arithmetic and logical unit and the past execution result of said instructions that is stored;
   wherein the information processor further comprises:
      (1) a device for recording the frequency of coincidence between the execution result of one of said instructions by said arithmetic and logical unit and the past execution result of one of said instructions that is stored, and
      (2) a second storage device for storing instructions whose frequencies of coincidence are not more than a reference value,
   wherein the information processor further comprises a device that prohibits the execution result of an instruction stored in said second storage device by said arithmetic and logical unit from being stored in said first storage device.

4. An information processor comprising:
   (a) an arithmetic and logical unit for executing instructions;
   (b) a history cache for storing execution results of past instructions;
   (c) an instruction cache for storing said instructions;
   (d) a history evaluation unit for outputting said execution result of one of said past instructions for executing following instructions;
   (e) a decoder for judging whether said one of said past instructions is a long latency instruction or not;
   (f) an instruction execution control buffer for holding one of said instructions to be executed; wherein
      (g-1) if said instruction to be executed is judged as a long latency instruction, said instruction execution control buffer outputs said judged instruction to said arithmetic and logical unit and said history evaluation unit at a same time, so that the following instruction is initiated before intrinsic execution termination of said judged instruction, and
      (g-2) if one of said instructions to be executed is not judged as a long latency instruction, said instruction execution control buffer outputs said judged instruction to said arithmetic and logical unit at first, so that the following instruction is initiated after intrinsic execution termination of said judged instruction.

* * * * *